(12) United States Patent
Ohlsson et al.

(10) Patent No.: US 12,464,357 B2
(45) Date of Patent: Nov. 4, 2025

(54) MEASUREMENT REPORTING CONFIGURATION

(71) Applicant: Telefonaktiebolaget LM Ericsson (publ), Stockholm (SE)

(72) Inventors: Oscar Ohlsson, Bromma (SE); Prajwol Kumar Nakarmi, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 352 days.

(21) Appl. No.: 17/795,299

(22) PCT Filed: Jan. 28, 2021

(86) PCT No.: PCT/SE2021/050054
§ 371 (c)(1),
(2) Date: Jul. 26, 2022

(87) PCT Pub. No.: WO2021/154144
PCT Pub. Date: Aug. 5, 2021

(65) Prior Publication Data
US 2023/0072998 A1      Mar. 9, 2023

Related U.S. Application Data

(60) Provisional application No. 62/967,643, filed on Jan. 30, 2020.

(51) Int. Cl.
*H04W 12/122* (2021.01)
*H04W 24/10* (2009.01)
*H04W 76/20* (2018.01)

(52) U.S. Cl.
CPC ......... *H04W 12/122* (2021.01); *H04W 24/10* (2013.01); *H04W 76/20* (2018.02)

(58) Field of Classification Search
CPC ... H04W 12/122; H04W 24/10; H04W 76/20; H04W 4/50; H04W 52/0245; H04W 52/0219; H04W 4/08
See application file for complete search history.

(56) References Cited

U.S. PATENT DOCUMENTS 8,838,091 B2 *  9/2014  Jung ..................... H04W 24/10
                                                    455/67.11
9,578,536 B2 *  2/2017  Abinader, Jr. .......... H04W 4/06
(Continued)

FOREIGN PATENT DOCUMENTS

CN    101931981 A    12/2010
CN    104919857 A    9/2015
(Continued)

OTHER PUBLICATIONS

3GPP, "3GPP TR 33.809 V0.2.0", 3rd Generation Partnership Project; Technical Specification Group Services and System Aspects; Study on 5G Security Enhancement against False Base Stations (Release 16), Feb. 2019, 1-16.
(Continued)

*Primary Examiner* — Baotran N To
(74) *Attorney, Agent, or Firm* — Murphy, Bilak & Homiller, PLLC

(57) ABSTRACT

Network equipment (12) comprising a processing circuitry (81) and a memory (83), where the memory contains instructions executable by the processing circuitry whereby the network equipment is configured to: identify a set of measurements to be used for false base station detection in an area (22); configure different sets (18-1, 18-2, 18-N) of one or more wireless devices (14) to report different respective measurements in the set by transmitting measurement reporting configurations (20-1, 20-2, 20-N) to the wireless devices (14); receive measurement reports from the different sets (18-1, 18-2, 18-N) of one or more wireless devices (14)
(Continued)

```
RECEIVING A MEASUREMENT REPORTING CONFIGURATION
AND INFORMATION BASED ON WHICH THE WIRELESS
DEVICE IS TO DECIDE WHETHER TO APPLY THE
MEASUREMENT REPORTING CONFIGURATION
                      310
                       ↓
DECIDING, BASED ON THE RECEIVED INFORMATION,
WHETHER TO APPLY THE MEASUREMENT REPORTING
CONFIGURATION (OR TO DISCARD THE MEASUREMENT
              REPORTING CONFIGURATION)
                      320
                       ↓
APPLYING OR NOT APPLYING (OR DISCARDING) THE
MEASUREMENT REPORTING CONFIGURATION DEPENDING
              ON SAID DECIDING
                      330
``` as configured; and perform false base station detection for the area (22) using the received measurement reports. Methods, a wireless device (14), and communication systems are also disclosed.

2 Claims, 17 Drawing Sheets

(56) References Cited

U.S. PATENT DOCUMENTS

| | | | |
|---|---|---|---|
| 10,200,869 | B2 * | 2/2019 | Norrman ............... H04W 12/12 |
| 2014/0051428 | A1 | 2/2014 | Jung et al. |
| 2016/0150434 | A1 | 5/2016 | Abinader et al. |
| 2016/0309332 | A1 | 10/2016 | Norrman et al. |
| 2018/0070239 | A1 | 3/2018 | Norrman et al. |
| 2021/0376894 | A1 * | 12/2021 | Cha ...................... H04B 7/0695 |
| 2022/0116809 | A1 * | 4/2022 | Cheng .................. H04W 76/30 |

FOREIGN PATENT DOCUMENTS

| | | |
|---|---|---|
| CN | 109587686 A | 4/2019 |
| CN | 110651492 A | 1/2020 |
| WO | 2009135983 A1 | 11/2009 |
| WO | 2015002656 A1 | 1/2015 |
| WO | 2015035590 A1 | 3/2015 |
| WO | 2015113309 A1 | 8/2015 |
| WO | 2017148511 A1 | 9/2017 |
| WO | 2019101348 A1 | 5/2019 |

OTHER PUBLICATIONS

3GPP, "3GPP TS 33.501 V16.1.0", 3rd Generation Partnership Project; Technical Specification Group Services and System Aspects; Security architecture and procedures for 5G system (Release 16), Dec. 2019, 1-202.

3GPP, "3rd Generation Partnership Project; Technical Specification Group Radio Access Network; NR; Radio Resource Control (RRC) protocol specification (Release 15)", 3GPP TS 38.331 V15.7.0, 1-527, Sep. 2019.

Nakarmi, Prajwol Kumar, et al., "Detecting false base stations in mobile networks", The Ericsson Blog, accessed Jan. 2020, 2020, 1-4.

SA3, "[Draft] LS on False Base Station Detection", 3GPP TSG-SA3 Meeting #97, S3-194687, Reno, US, Nov. 18-22, 2019, 1-2.

3GPP, "3GPP TR 33.809 V0.8.0", 3rd Generation Partnership Project; Technical Specification Group Services and System Aspects Study on 5G Security Enhancement against False Base Stations (Release 16), Nov. 2019, 1-67.

3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

* cited by examiner

MEASUREMENT REPORTING CONFIGURATION

TECHNICAL FIELD

The invention relates to network equipment, a wireless device, methods, computer programs, computer readable storage media, and communication systems.

BACKGROUND

A wireless device can be configured by a wireless communication network to provide the network with measurements of neighbour cells, e.g., to facilitate handovers, enable Self-Organizing Network (SON) features, and the like. These measurement reports can also be used for security purposes to detect false base stations, also known as International Mobile Subscription Identifier (IMSI) catchers, that maliciously eavesdrop on and/or track wireless devices. The network may for instance evaluate the measurement reports to detect anomalies or deviation from an expected behavior or pattern. For example, if the wireless device reports an unexpected Physical Cell Identity (PCI), such an anomaly may indicate the presence of a false base station.

A framework for false base station detection is described in the informative Annex E of the document 3GPP TS 33.501 Security architecture and procedures for 5G System, v16.1.0.

The use of reported measurements for false base station detection and/or other purposes benefits the network and its subscribers as a whole. However, measurement reporting imposes further load on and causes significant impact to wireless devices connected to the network. Measurement reporting for instance threatens to interrupt service for and increase the power consumption of any individual wireless device. This may prove especially true if measurement reporting for false base station detection taxes wireless devices to a greater extent, such as by increasing the frequency of and/or content required for reporting.

SUMMARY

An object of the invention is to enable a reduction of load on and/or impact on a wireless device in conjunction with measurement reports to detect false base stations.

Some embodiments herein control and/or configure measurement reporting in a wireless communication network so as to effectively reduce the load on and/or impact to any individual wireless device. According to one or more embodiments, for example, network equipment in the network configures different sets of one or more wireless devices to report different measurements in a set, e.g., so as to distribute measurement reporting for the set of measurements across multiple wireless devices. Rather than each wireless device being required to report all of the measurements in the set, then, each wireless device need only report a portion of the measurements in the set. In other embodiments, each individual wireless device autonomously decides whether to apply a measurement reporting configuration, e.g., in such a way and/or according to certain rules so that different wireless devices make different decisions about whether to apply the measurement reporting configuration. The effect of any of the above embodiments thereby distributes the load and/or impact attributable to measurement reporting across multiple wireless devices, so as to reduce the load on and/or impact to any individual wireless device. This may in turn provide more continuous service and/or better power conservation for each individual wireless device. Such may especially facilitate and prove advantageous for detecting false base stations, since measurement reporting for false base station detection threatens to tax wireless devices even more than measurement reporting for other purposes.

A first aspect of the invention relates to network equipment, which comprises a processing circuitry and a memory, the memory containing instructions executable by the processing circuitry. The network equipment is configured to: identify a set of measurements to be used for false base station detection in an area; configure different sets of one or more wireless devices to report different respective measurements in the set by transmitting measurement reporting configurations to the wireless devices; receive measurement reports from the different sets of one or more wireless devices as configured; and perform false base station detection for the area using the received measurement reports.

The network equipment is in an embodiment configured to select only a portion of all wireless devices in the area to use for false base station detection for the area, wherein the one or more wireless devices in each of the different sets are included in the selected portion.

The network equipment is in an embodiment configured to determine how many wireless devices to select to use for false base station detection in the area, based on one or more of: a level of suspicion that a false base station will be detected in the area; a speed with which false base station detection is to be performed in the area; or a reliability with which false base station detection is to be performed in the area.

The network equipment is in an embodiment configured to randomly select the portion of all wireless devices in the area to use for false base station detection in the area.

The network equipment is in an embodiment configured to select the portion of all wireless devices in the area to use for false base station detection in the area, based on one or more device properties.

The network equipment is in an embodiment configured to determine which wireless devices are to report which measurements in the set, based on one or more device properties.

The network equipment is in an embodiment configured to configure the different sets of one or more wireless devices to report different respective measurements in the set while the wireless devices are in a Radio Resource Control connected state.

The network equipment is in an embodiment configured to configure the different sets of one or more wireless devices to report different respective measurements in the set while the wireless devices are in a Radio Resource Control, RRC, idle state or an RRC inactive state.

The network equipment is in an embodiment a radio base station.

A second aspect relates to a method performed by network equipment configured for use in a wireless communication network. The method comprises: identifying a set of measurements to be used for false base station detection in an area; configuring different sets of one or more wireless devices to report different respective measurements in the set by transmitting of measurement reporting configurations to the wireless devices; receiving measurement reports from the different sets of one or more wireless devices as configured; and performing false base station detection for the area using the received measurement reports.

In an embodiment of the first and second aspects, the set of measurements include measurements in multiple sub-areas of the area, and said configuring comprises configuring the different sets of one or more wireless devices to report measurements in different sub-areas of the area.

In an embodiment of the first and second aspects, the sub-areas of the area correspond to at least one of the following: cells providing radio coverage over the area; core network tracking areas covering the area; geographical regions in the area; and points of interest in the area.

In an embodiment of the first and second aspects, the set of measurements include measurements on multiple frequencies or frequency ranges, and said configuring comprises configuring the different sets of one or more wireless devices to report measurements on different frequencies or frequency ranges.

In an embodiment of the first and second aspects, the set of measurements includes measurements of cells identified by multiple cell identifiers, and said configuring comprises configuring the different sets of one or more wireless devices to report measurements of cells identified by different cell identifiers.

In an embodiment of the first and second aspects, the set of measurements includes measurements of multiple types, and wherein said configuring comprises configuring the different sets of one or more wireless devices to report measurements of different types.

In an embodiment of the first and second aspects, the set of measurements includes measurements performed at different times, and said configuring comprises configuring the different sets of one or more wireless devices to report measurements performed at different times.

The set of measurements includes in an embodiment measurements performed at different times of the day, and wherein said configuring comprises configuring the different sets of one or more wireless devices to report measurements performed at different times of the day.

An embodiment comprises selecting only a portion of all wireless devices in the area to use for false base station detection in the area, wherein the one or more wireless devices in each of the different sets are included in the selected portion.

An embodiment comprises determining how many wireless devices to select to use for false base station detection in the area, based on one or more of: a level of suspicion that a false base station will be detected in the area; a speed with which false base station detection is to be performed in the area; or a reliability with which false base station detection is to be performed in the area.

Said selecting comprises in an embodiment randomly selecting the portion of all wireless devices in the area to use for false base station detection in the area.

Said selecting comprises in an embodiment selecting the portion of all wireless devices in the area to use for false base station detection in the area, based on one or more device properties.

An embodiment comprises determining which wireless devices are to report which measurements in the set, based on one or more device properties.

In an embodiment of the first and second aspects, the one or more device properties include one or more of: device identity; device access class; device radio capabilities; device brand or model; device screen size; device price; device Radio Resource Control, RRC, state; device service type; device subscriber profile; device quality of service, QoS, profile; or device network slice.

The area is in an embodiment of the first and second aspects a geographical region surrounding a point of interest.

Said configuring comprises in an embodiment configuring of different sets of one or more wireless devices to report different respective measurements in the set while in a Radio Resource Control connected state.

Said configuring comprises in an embodiment configuring of different sets of one or more wireless devices to report different respective measurements in the set while in a Radio Resource Control, RRC, idle state or an RRC inactive state.

A third aspect relates to a wireless device comprising processing circuitry and memory. The memory containing instructions executable by the processing circuitry. The wireless device is configured to: receive, from network equipment, a measurement reporting configuration and information based on which the wireless device is to decide whether to apply the measurement reporting configuration; decide, based on the received information, whether to apply the measurement reporting configuration; and apply the measurement reporting configuration, if the wireless device has decided to apply the measurement reporting configuration.

In an embodiment of the wireless device, the information comprises a threshold, and the wireless device is configured to generate a random number, and decide whether or not to apply the measurement reporting configuration depending on whether or not the generated random number exceeds the threshold.

In an embodiment of the wireless device, the information comprises a certain number, and that the wireless device is configured to: divide a device identifier of the wireless device by the certain number, and decide whether or not to apply the measurement reporting configuration depending on whether or not the computed device identifier is evenly divisible by the certain number.

In an embodiment of the wireless device, the information is information based on which the wireless device is to decide whether to apply the measurement reporting configuration or discard the measurement reporting configuration, and the wireless terminal is configured to: decide, based on the received information, whether to apply the measurement reporting configuration or to discard the measurement reporting configuration; and discard the measurement reporting configuration if the wireless device decides that the measurement reporting configuration shall be discarded.

In an embodiment, the information comprises a threshold, and the wireless device is configured to generate a random number, and decide whether to discard the measurement reporting configuration depending on whether or not the generated random number exceeds the threshold.

In an embodiment, the information comprises a certain number, and that the wireless device is configured to: divide a device identifier of the wireless device by the certain number, and decide whether or not to discard the measurement reporting configuration depending on whether or not the computed device identifier is evenly divisible by the certain number.

A fourth aspect relates to method performed by a wireless device. The method comprises: receiving, from network equipment, a measurement reporting configuration and information based on which the wireless device is to decide whether to apply the measurement reporting configuration; deciding, based on the received information, whether to apply the measurement reporting configuration; and applying the measurement reporting configuration if the wireless device has decided to apply the measurement reporting configuration.

In an embodiment, the information comprises a threshold, and the method comprises generating a random number, and deciding whether or not to apply the measurement reporting configuration depending on whether or not the generated random number exceeds the threshold.

In an embodiment, information comprises a certain number, and that the method comprises: dividing a device identifier of the wireless device by the certain number, and deciding whether or not to apply the measurement reporting configuration depending on whether or not the computed device identifier is evenly divisible by the certain number.

In an embodiment, the information is information based on which the wireless device is to decide whether to apply the measurement reporting configuration or discard the measurement reporting configuration, and the method comprises: deciding, based on the received information, whether to apply the measurement reporting configuration or to discard the measurement reporting configuration; and discarding the measurement reporting configuration if the wireless device has decided that the measurement reporting configuration shall be discarded.

In an embodiment, the information comprises a threshold, and the method comprises generating a random number, and deciding whether to discard the measurement reporting configuration depending on whether or not the generated random number exceeds the threshold.

In an embodiment, the information comprises a certain number, and that the method comprises: dividing a device identifier of the wireless device by the certain number, and deciding whether or not to discard the measurement reporting configuration depending on whether or not the computed device identifier is evenly divisible by the certain number.

In an embodiment of the third and fourth aspects, the information comprises an indication of one or more device properties, wherein the one or more device properties include one or more of: device identity; device access class; device radio capabilities; device brand or model; device screen size; device price; device Radio Resource Control state; device service type; device subscriber profile; device quality of service profile; or device network slice.

In an embodiment of the third and fourth aspects, the measurement reporting configuration is a configuration for reporting one or more measurements usable to detect a false base station.

In an embodiment of the third and fourth aspects, the measurement reporting configuration is a configuration for reporting one or more measurements usable for a self-organizing network, minimization of drive testing, automatic neighbour relations, or mobility.

In an embodiment of the third and fourth aspects, the measurement reporting configuration is a configuration for reporting one or more measurements in an RRC connected state.

In an embodiment of the third and fourth aspects, the measurement reporting configuration is a configuration for reporting one or more measurements in an RRC idle state or an RRC inactive state.

A firth aspect relates to computer program, which comprises instructions which, when executed by at least one processor of a network equipment, causes the network equipment to perform a method according to the second aspect including any of its embodiments.

A sixth aspect relates to a computer program, which comprises instructions which, when executed by at least one processor of a wireless device, causes the wireless device to perform a method according to the fourth aspect including any of its embodiments.

A seventh aspect relates to a computer readable storage medium which comprises a computer program according to the fifth and/or sixth aspect.

An eighth aspect relates to a communication system including a host computer comprising: processing circuitry configured to provide user data; and a communication interface configured to forward the user data to a cellular network for transmission to a user equipment, wherein the cellular network comprises network equipment in the form of a base station having a radio interface and processing circuitry. The processing circuitry of the base station is configured to perform the method according to the second aspect including any of its embodiments.

The communication system includes the network equipment in an embodiment.

The communication system includes the user equipment in an embodiment, wherein the user equipment is configured to communicate with the base station.

A ninth aspect relates to a communication system including a host computer, which comprises: processing circuitry configured to provide user data; and a communication interface configured to forward user data to a cellular network for transmission to a wireless device in the form of a user equipment, UE, wherein the UE comprises a radio interface and processing circuitry. The components of the UE are configured to perform a method according to the fourth aspect including any of its embodiments.

The cellular network includes in an embodiment a base station configured to communicate with the UE.

In an embodiment of the eighth and ninth aspects, the processing circuitry of the host computer is configured to execute a host application, thereby providing the user data; and the user equipment comprises processing circuitry configured to execute a client application associated with the host application.

DETAILED DESCRIPTION

Figure 1:
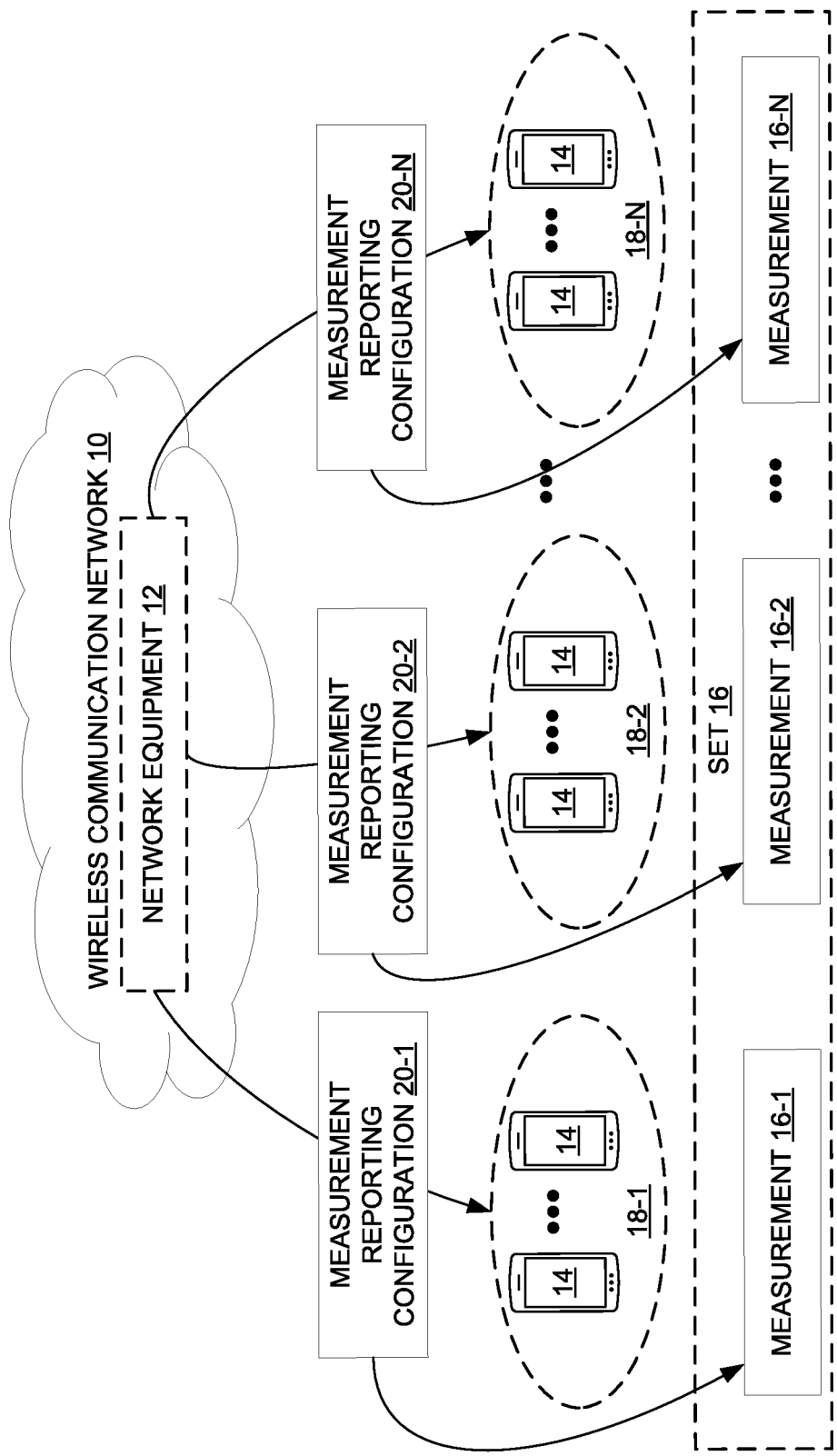
FIG. 1 is a block diagram of a wireless communication network according to some embodiments.

FIG. 1 shows a wireless communication network 10 (e.g., a 5G network) according to some embodiments. The wireless communication network 10 includes network equipment 12. The network equipment 12 controls and/or configures wireless devices 14 in the network 10 to perform measurement reporting.

The network equipment 12 in this regard controls and/or configures reporting fora set 16 of measurements 16-1, 16-2, . . . 16-N, where N>1. The network equipment 12 notably controls and/or configures different sets 18-1, 18-2, . . . 18-N of one or more wireless devices 14 to report the different measurements 16-1, 16-2, . . . 16-N in the set 16. As shown, for example, the network equipment 12 transmits different measurement reporting configurations 20-1, 20-2, . . . 20-N to the different sets 18-1, 18-2, . . . 18-N of one or more wireless devices 14, and those different measurement reporting configurations 20-1, 20-2, . . . 20-N configure reporting for different respective measurements 16-1, 16-2, . . . 16-N in the set 16. In these and other embodiments, then, the network equipment 16 effectively distributes measurement reporting for the set 16 of measurements across multiple wireless devices 14. Indeed, rather than each wireless device 14 being required to report all of the measurements 16-1, 16-2, . . . 16-N in the set 16, each wireless device 14 need only report a portion of the measurements in the set 16.

As shown, for example, the network equipment 12 configures the first set 18-1 of wireless device(s) 14 to report measurement 16-1, without configuring the first set 18-1 of wireless device(s) 14 to report any of the other measurements 16-2 . . . 16-N in the set 16. And the network equipment 12 configures the second set 18-2 of wireless device(s) 14 to report measurement 16-2, without configuring the second set 18-2 of wireless device(s) 14 to report any of the other measurements 16-1 or 16-3 . . . 16-N in the set 16. Similarly, the network equipment 12 configures set 18-N of wireless device(s) 14 to report measurement 16-N, without configuring set 18-N of wireless device(s) 14 to report any of the other measurements 16-1 . . . 16-(N−1) in the set 16.

Figure 2:
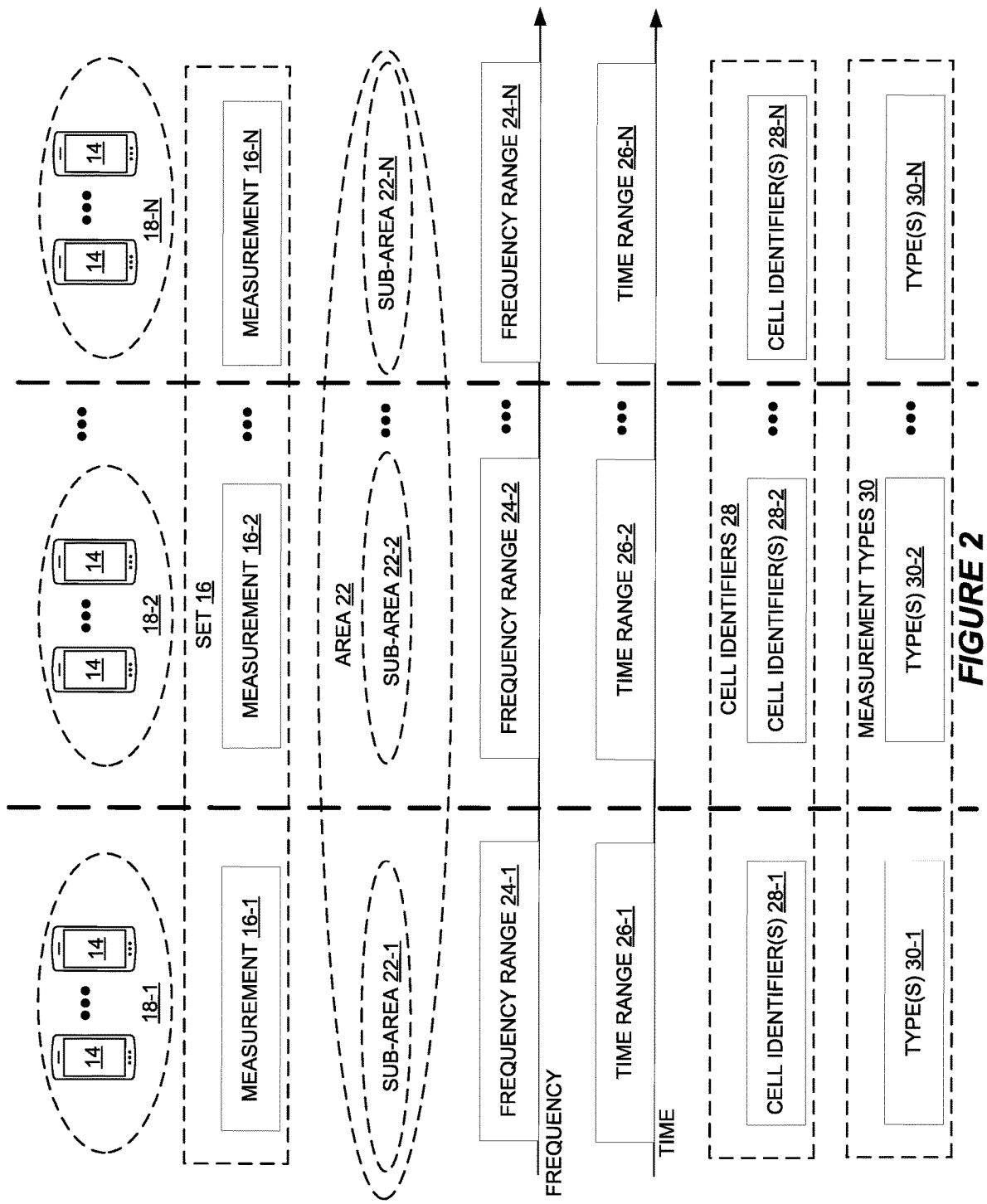
FIG. 2 is a block diagram of measurement reporting according to some embodiments.

The measurements 16-1, 16-2, . . . 16-N in the set 16 may be distinguishable from one another in terms of one or more characteristics, properties, restrictions, or targets associated with the measurements. FIG. 2 shows some examples of these and other embodiments.

As shown in FIG. 2, the set 16 of measurements 16-1, 16-2, . . . 16-N includes measurements in multiple sub-areas 22-1, 22-2, . . . 22-N of an area 22. An area 22 as used herein refers to a specific extent of land or space, e.g., so as to be a specific part or region of the Earth's surface. The sub-areas 22-1, 22-2, . . . 22-N may thereby correspond to respective portions of the area 22. In one or more embodiments, for example, the sub-areas 22-1, 22-2, . . . 22-N correspond to cells providing radio coverage over the area 22, core network tracking areas covering the area 22, geographical regions in the area 22, or points of interest (e.g., landmarks, attractions, buildings, etc.) in the area 22.

Regardless of the specific nature of the area 22, measurement 16-1 is a measurement in sub-area 22-1, measurement 16-2 is a measurement in sub-area 22-2, and measurement 16-N is a measurement in sub-area 22-N. Accordingly, the network equipment 12 configures the different sets 18-1, 18-2, . . . 18-N of wireless devices 14 to report measurements in different respective sub-areas 22-1, 22-2, . . . 22-N of the area 22. For example, the measurement reporting configurations 20-1, 20-2, . . . 20-N sent to the different sets 18-1, 18-2, . . . 18-N of wireless devices 14 may identify the different sub-areas 22-1, 22-2, . . . 22-N over which measurements are to be performed. The measurement reporting configurations 20-1, 20-2, . . . 20-N may for instance specify Global Positioning System (GPS) coordinates of the sub-areas 22-1, 22-2, . . . 22-N, identifiers or codes associated with the sub-areas 22-1, 22-2, . . . 22-N (e.g., tracking area codes or cell identifiers such as Physical Cell Identities, PCIs), or descriptive names associated with the sub-areas 22-1, 22-2, . . . 22-N (e.g., a landmark name, a shopping mall name, etc.).

Alternatively or additionally, the set 16 of measurements 16-1, 16-2, . . . 16-N includes measurements on multiple frequencies or frequency ranges 24-1, 24-2, . . . 24-N. In this case, measurement 16-1 is a measurement in frequency range 24-1, measurement 16-2 is a measurement in frequency range 24-2, and measurement 16-N is a measurement in frequency range 24-N. Accordingly, the network equipment 12 configures the different sets 18-1, 18-2, . . . 18-N of wireless devices 14 to report measurements in different respective frequency ranges 24-1, 24-2, . . . 24-N. For example, the measurement reporting configurations 20-1, 20-2, . . . 20-N sent to the different sets 18-1, 18-2, . . . 18-N of wireless devices 14 may identify the different respective frequency ranges 24-1, 24-2, . . . 24-N over which measurements are to be performed. The measurement reporting configurations 20-1, 20-2, . . . 20-N may for instance specify frequencies or frequency ranges 24-1, 24-2, . . . 24-N in terms of absolute radio-frequency channel numbers (ARFCNs), frequency band names, or the like.

Alternatively or additionally, the set 16 of measurements 16-1, 16-2, . . . 16-N includes measurements at different times or in different times ranges 26-1, 26-2, . . . 26-N. The starting and ending points of a time range may each be specified in terms of a quantitative time of day (e.g., 8:00 AM), a qualitative time of day (e.g., "morning"), and/or a date (e.g., Nov. 12, 2020). In any event, measurement 16-1 as shown is a measurement in time range 26-1, measurement 16-2 is a measurement in time range 26-2, and measurement 16-N is a measurement in time range 26-N. Accordingly, the network equipment 12 configures the different sets 18-1, 18-2, . . . 18-N of wireless devices 14 to report measurements in different respective time ranges 26-1, 26-2, . . . 26-N. For example, the measurement reporting configurations 20-1, 20-2, . . . 20-N sent to the different sets 18-1, 18-2, . . . 18-N of wireless devices 14 may identify the different respective time ranges 26-1, 26-2, . . . 26-N in which measurements are to be performed.

Alternatively or additionally, the set 16 of measurements 16-1, 16-2, . . . 16-N includes measurements of cells identified by multiple cell identifiers 28 As shown, for example, measurement 16-1 is a measurement of cell identifier(s) 28-1, measurement 16-2 is a measurement of cell identifier(s) 28-2, and measurement 16-N is a measurement in cell identifier(s) 28-N. Accordingly, the network equipment 12 configures the different sets 18-1, 18-2, . . . 18-N of wireless devices 14 to report measurements of different cell identifiers 28-1, 28-2, . . . 28-N. For example, the measurement reporting configurations 20-1, 20-2, . . . 20-N sent to the different sets 18-1, 18-2, . . . 18-N of wireless devices 14 may identify the different respective cell identifiers 28-1, 28-2, . . . 28-N on which measurements are to be performed.

Alternatively or additionally, the set 16 of measurements 16-1, 16-2, . . . 16-N includes measurements of multiple types 30. As shown, for example, measurement 16-1 is a measurement of type(s) 30-1, measurement 16-2 is a measurement of type(s) 30-2, and measurement 16-N is a measurement in type(s) 30-N. Accordingly, the network equipment 12 configures the different sets 18-1, 18-2, . . . 18-N of wireless devices 14 to report measurements of different type(s) 30-1, 30-2, . . . 30-N. For example, the measurement reporting configurations 20-1, 20-2, . . . 20-N sent to the different sets 18-1, 18-2, . . . 18-N of wireless devices 14 may identify the different respective type(s) 30-1, 30-2, . . . 30-N of measurements to be performed. The different respective type(s) 30-1, 30-2, . . . 30-N may include for instance a Reference Signal Received Power (RSRP) measurement, a Reference Signal Received Quality (RSRQ) measurement, a Cell Global Identity (CGI) measurement, a measurement of a hash of a Master Information Block (MIB), a measurement of one or more System Information Blocks (SIBs), etc. In this latter case, for example, one set of wireless devices may report a hash of MIB, another set of wireless devices may report a hash of SIB X, (like SIB1) and yet another set of wireless devices may report a hash of SIB Y (like SIB2).

No matter the particular nature of the measurements 16-1, 16-2, . . . 16-N in the set 16, though, the network equipment 12 according to some embodiments configures measurement reporting in this way so that the resulting measurement reports can be used for a particular purpose. In some embodiments, the network equipment 12 uses the measurement reports for performing false base station detection (e.g., in the area 22), for a self-organizing network, for minimization of drive testing, for automatic neighbour relations, and/or for mobility. Towards this purpose, the network equipment 12 may first identify the set 16 of measurements 16-1, 16-2, . . . 16-N as being the set 16 of measurements that the network equipment 12 will use or desires to use for that purpose (e.g., false base station detection in the area 22). Then, rather than configure all of the wireless devices 14 (e.g., in the area 22) to each report all of the measurements 16-1, 16-2, . . . 16-N in the set 16, the network equipment 12 configures different sets 18-1, 18-2, . . . 18-N of the wireless devices 14 to report different respective measurements 16-1, 16-2, . . . 16-N in the set 16. The network equipment's configuration may thereby represent a dynamic dividing or distributing of the measurement reporting for the set 16 amongst multiple devices 14. Distributing measurement reporting for this or other purposes across multiple wireless devices in this way advantageously reduces the load on and/or impact to any individual wireless device 14. This may in turn provide more continuous service and/or better power conservation for each individual wireless device 14.

In some embodiments, the network equipment 12 configures all of the wireless devices 14 (i.e. initiate the wireless devices 14 to be configure themselves by sending them a measurement reporting configuration), e.g., in the area 22, to report a measurement in the set 16. In other embodiments, though, the network equipment 12 selects only a portion of all wireless devices 14 (e.g., in the area 22) to report a measurement in the set 16. The network equipment 12 may for example select a certain number of wireless devices 14 (e.g., in the area 22) that are to report measurements. In these and other embodiments, the network equipment 12 may determine how many wireless devices 14 to select, based on one or more of: a priority of the purpose for which the measurement results are to be used; a speed with which the purpose is to be accomplished; or a reliability with which the purpose is to be accomplished. Where the purpose is false base station detection in the area 22, for example, the network equipment 12 may determine how many wireless devices 14 to select, based on one or more of: a level of suspicion that a false base station will be detected in the area 22; a speed with which false base station detection is to be performed in the area; or a reliability with which false base station detection is to be performed in the area 22. For instance, under normal operation conditions, none or only a few of the wireless devices in the area 22 may be configured to provide measurement reports. But, if the level of suspicion of a false base station in the area 22 rises above a threshold, the network equipment 12 may configure more wireless devices 12 to provide measurement reports in the area 22. A value representing the level of suspicion can be obtained or calculated by several means. This value is then compared with the threshold. One example of the basis for how the value representing the level of suspicion can be calculated is to use the number of UEs/wireless devices 14 connected to the network 10, in particular the area 22 covered by the network 10, at a certain time (e.g. currently connected) vs. the number of UEs expected to be connected to the network 10. The number of UEs expected to be connected in the area 22 may be based on a statistical calculation where the number of connected UEs have been monitored for some time in order to be able to accurately assess the number of UEs which usually are connected to the network 10, perhaps in total, but perhaps more adequately in a certain area like the area 22. If during an office hour in the area 22, it is expected that 100 UEs to be connected to the network in area 22, but the network only finds 5 UEs, it can be a high level of suspicion; whereas, if 85 UEs are connected, it can be low level of suspicion. In other words, the level of suspicion could be calculated as a ratio between the current number of UEs and the expected number of UEs and where a low ratio would mean a high level of suspicion. Another example is to use radio resource usage in base stations of the area 22. If the network 10, such as the network equipment 12 or any computing device connected to the network equipment 12 determines that the usage in one base station has significantly decreased (e.g. calculation by comparing actual communication with expected communication according to a suitable parameter, or comparing a derivative of the number of connected UEs with a derivative threshold) without a certain degree of corresponding increase in neighbouring base station, then the level of suspicion could be set as high.

Regardless of the purpose, though, the network equipment 12 may in some embodiments then randomly select the portion of the wireless devices 14 to configure for measurement reporting. Or, in other embodiments, the network equipment 12 may select the portion of the wireless devices 14 to be configured for measurement reporting, based on one or more device properties, and/or may determine which wireless devices 14 are to report which measurements in the set 16, based on the one or more device properties. The one or more device properties may include for instance one or more of: device identity (e.g., IMSI, GUTI, C-RNTI, IMEI, I-RNTI, etc.); device access class; device radio capabilities; device brand or model; device screen size; device price; device Radio Resource Control, RRC, state; device service type; device subscriber profile; device quality of service, QoS, profile; or device network slice. With regard to device identity, for instance, the network equipment 12 may configure every X wireless device for measurement reporting if the device's identity is evenly divisible by X. Alternatively or additionally, with regard to device RRC state, the network equipment 12 may bias its selection towards devices in an RRC Idle or RRC Inactive state, since devices in an RRC Connected state are more sensitive to interruptions from measurement reporting. Alternatively or additionally, with regard to device service type, device subscriber profile, device network slice, and/or device QoS profile, the network equipment 12 may bias its selection towards Mobile Broadband (MBB) devices over Ultra-Reliable Low-Latency Communication (URLLC) devices, since MBB devices are less sensitive to interruptions from measurement reporting. Alternatively or additionally, with regard to device radio capabilities, the network equipment 12 may bias its selection towards devices that have the radio capabilities associated with the purpose for which the measurements will be used, e.g., bias selection towards GSM capable devices in order to detect a false GSM base station.

Figure 3:
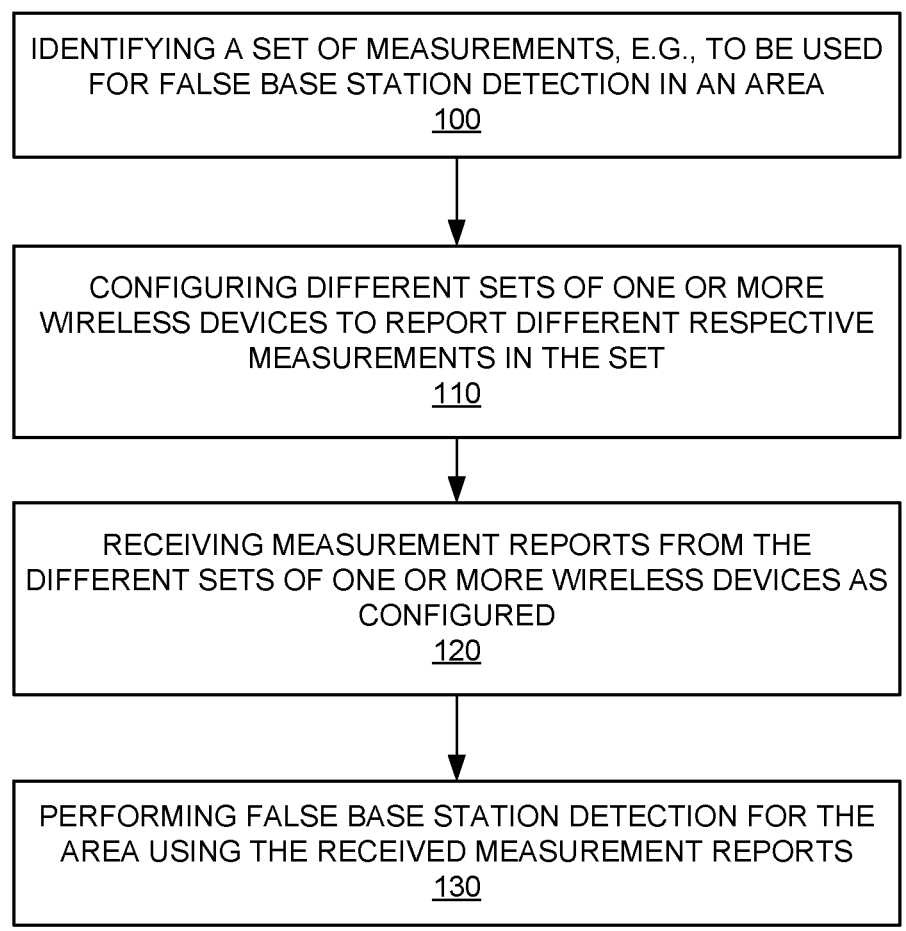
FIG. 3 is a logic flow diagram of a method performed by network equipment according to some embodiments.

In view of the above modifications and variations, FIG. 3 depicts a method performed by the network equipment 12 configured for use in the wireless communication network 10 in accordance with particular embodiments. The method includes identifying a set 16 of measurements 16-1, 16-2, . . . 16-N, e.g., to be used for false base station detection in an area 22 (Block 100). The method also includes configuring different sets 18-1, 18-2, . . . 18-N of one or more wireless devices 14 to report different respective measurements 16-1, 16-2, . . . 16-N in the set 16 (Block 110). In other words, the network equipment 12 initiate the different sets of wireless devices 14 to be configured to report the different respective measurements 16-1, 16-2, . . . 16-N by transmitting measurement reporting configurations to the wireless devices 14. The method comprises receiving measurement reports from the different sets 18-1, 18-2, . . . 18-N of one or more of the wireless devices 14 as configured (Block 120). The method further comprises performing an action, e.g., false base station detection in the area 22, using the received measurement reports (Block 130).

In some embodiments, the set 16 of measurements 16-1, 16-2, . . . 16-N include measurements in multiple sub-areas of the area 22. In this case, said configuring may comprise configuring the different sets 18-1, 18-2, . . . 18-N of one or more wireless devices 14 to report measurements in different sub-areas of the area 22. In one or more embodiments, the sub-areas of the area 22 correspond to cells covering the area; core network tracking areas covering the area 22; geographical regions in the area 22; or points of interest in the area 22.

Alternatively or additionally, the set 16 of measurements 16-1, 16-2, . . . 16-N include measurements on multiple frequencies or frequency bands. In this case, said configuring may comprise configuring the different sets 18-1, 18-2, . . . 18-N of one or more wireless devices 14 to report measurements on different frequencies or frequency bands.

Alternatively or additionally, the set 16 of measurements 16-1, 16-2, . . . 16-N includes measurements of cells identified by multiple cell identifiers. In this case, said configuring may comprise configuring the different sets 18-1, 18-2, . . . 18-N of one or more wireless devices 14 to report measurements of cells identified by different cell identifiers.

Alternatively or additionally, the set 16 of measurements 16-1, 16-2, . . . 16-N includes measurements of multiple types. In this case, said configuring may comprise configuring the different sets 18-1, 18-2, . . . 18-N of one or more wireless devices 14 to report measurements of different types.

Alternatively or additionally, the set 16 of measurements 16-1, 16-2, . . . 16-N includes measurements performed at different times. In this case, said configuring may comprise configuring the different sets 18-1, 18-2, . . . 18-N of one or more wireless devices 14 to report measurements performed at different times.

Alternatively or additionally, the set 16 of measurements 16-1, 16-2, . . . 16-N includes measurements performed at different times of the day. In this case, said configuring may comprise configuring the different sets 18-1, 18-2, . . . 18-N of one or more wireless devices 14 to report measurements performed at different times of the day.

In some embodiments, the method may further comprise selecting only a portion of all wireless devices in the area to use for false base station detection in the area, wherein the one or more wireless devices in each of the different sets are included in the selected portion. In one or more embodiments, for example, the method may comprise determining how many wireless devices to select to use for false base station detection in the area, based on one or more of: (i) a level of suspicion that a false base station will be detected in the area; (ii) a speed with which false base station detection is to be performed in the area; or (iii) a reliability with which false base station detection is to be performed in the area. Regardless, the selecting may comprise randomly selecting the portion of all wireless devices in the area to use for false base station detection in the area. Or, the selecting may comprise selecting the portion of all wireless devices in the area to use for false base station detection in the area, based on one or more device properties. In one embodiment, for example, the one or more device properties include one or more of: device identity; device access class; device radio capabilities; device brand or model; device screen size; device price; device Radio Resource Control, RRC, state; device service type; device subscriber profile; device quality of service, QoS, profile; or device network slice.

In any of these embodiments, the area 22 may be a geographical area surrounding a point of interest.

In some embodiments, said configuring comprises configuring different sets 18-1, 18-2, . . . 18-N of one or more wireless devices 14 to report different respective measurements in the set while in a Radio Resource Control, RRC, connected state. In other embodiments, said configuring comprises configuring different sets 18-1, 18-2, . . . 18-N of one or more wireless devices 14 to report different respective measurements in the set while in a Radio Resource Control, RRC, idle state or an RRC inactive state.

In the above embodiments, the network equipment 12 may centrally decide which of the wireless devices 14 are to report which measurements and configure the wireless devices 14 accordingly. The wireless devices 14 in this case may receive the measurement reporting configurations 20-1, 20-2, . . . 20-N and unconditionally apply them. In other embodiments, though, each wireless device 14 itself effectively decides in an autonomous way whether or not to report measurements. Each wireless device 14 may for example receive a measurement reporting configuration and autonomously decide whether to apply that measurement reporting configuration. In some embodiments, if the wireless device 14 decides not to apply the measurement reporting configuration, the wireless device 14 discards the measurement reporting configuration. The wireless device 14 may make this decision one time, upon receiving the measurement reporting configuration, as opposed to re-evaluating its decision periodically after receiving the measurement reporting configuration.

Figure 4:
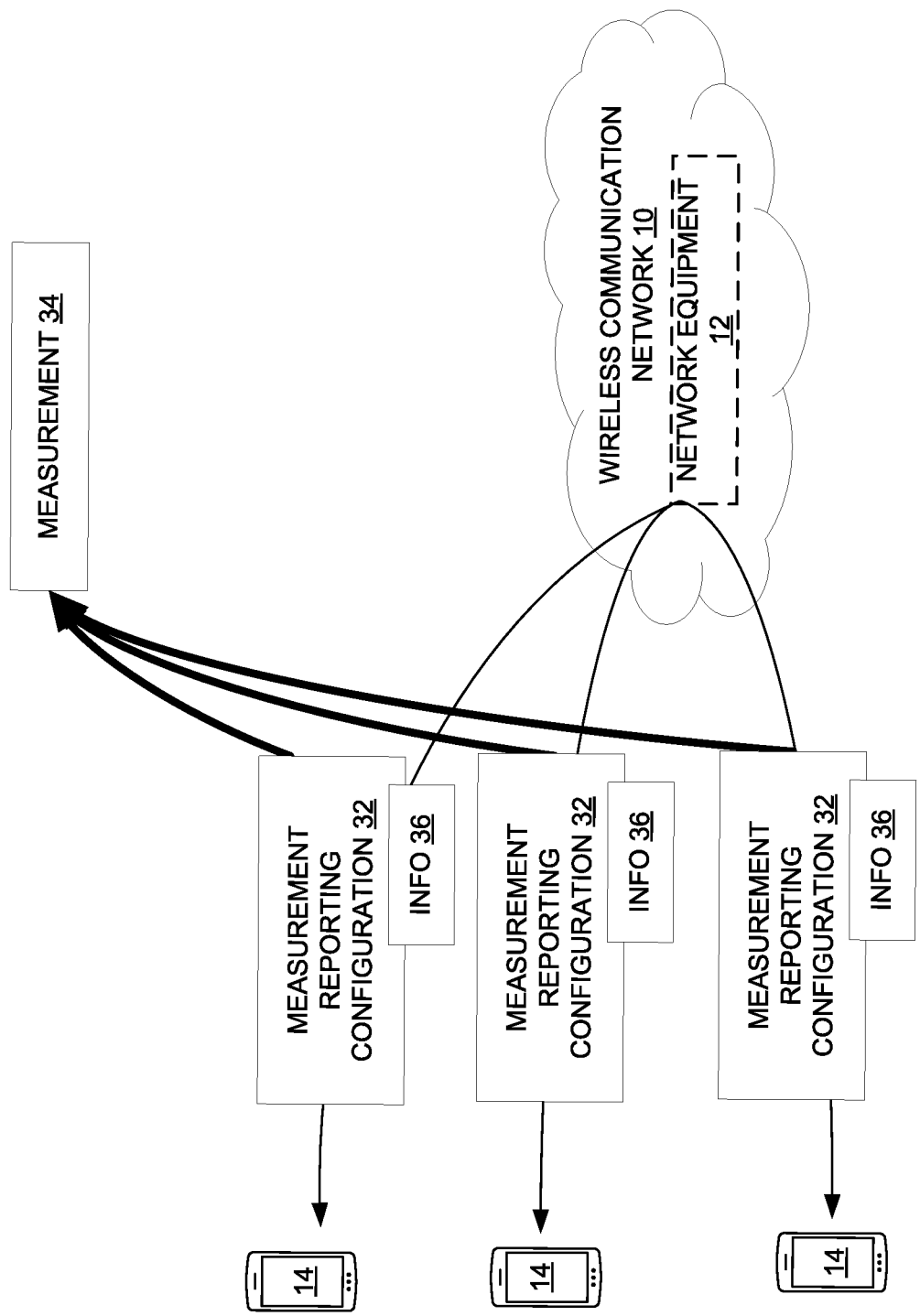
FIG. 4 is a block diagram of a wireless communication network according to embodiments.

As shown in FIG. 4, for example, the network equipment 12 transmits the same measurement reporting configuration 32 to each wireless device 14. If any given wireless device 14 applies that measurement reporting configuration 32, the measurement reporting configuration 32 will configure the wireless device to report a certain measurement 34. However, the network equipment 12 also transmits to each wireless device 14 information ("info") 36 based on which each wireless device 14 is to decide whether to apply the measurement reporting configuration 32. In some embodiments, this information 36 is included in the measurement reporting configuration 32 itself. Regardless, each individual wireless device 14 accordingly autonomously decides whether to apply the measurement reporting configuration 32, e.g., in such a way and/or according to certain rules so that different wireless devices 14 can or do make different decisions about whether to apply the measurement reporting configuration 32. The decision by a wireless device 14 may be made based on the same criteria and/or in the same way as described above for the network equipment 12 making the decision.

For example, the information 36 may comprise a threshold. In some embodiments, then, each wireless device 14 generates a random number. If the random number exceeds the threshold, the wireless device applies the measurement reporting configuration 32. If the random number does not exceed the threshold, the wireless device does not apply the measurement reporting configuration 32. In fact, the wireless device may discard the measurement reporting configuration 32, e.g., before and/or without re-evaluating at a later time whether to apply the measurement reporting configuration 32.

Although not shown in FIG. 4, the network equipment 12 in some embodiments may operate as described above for multiple different types of measurement reporting configurations. The effect may thereby be that different wireless devices 14 decide to apply different measurement reporting configurations, so that measurement reporting ends up being distributed amongst multiple wireless devices similarly to that as described above with respect to FIGS. 1 and 2. Distributing measurement reporting across multiple wireless devices in this way advantageously reduces the load on and/or impact to any individual wireless device 14. This may in turn provide more continuous service and/or better power conservation for each individual wireless device 14.

Figure 5:
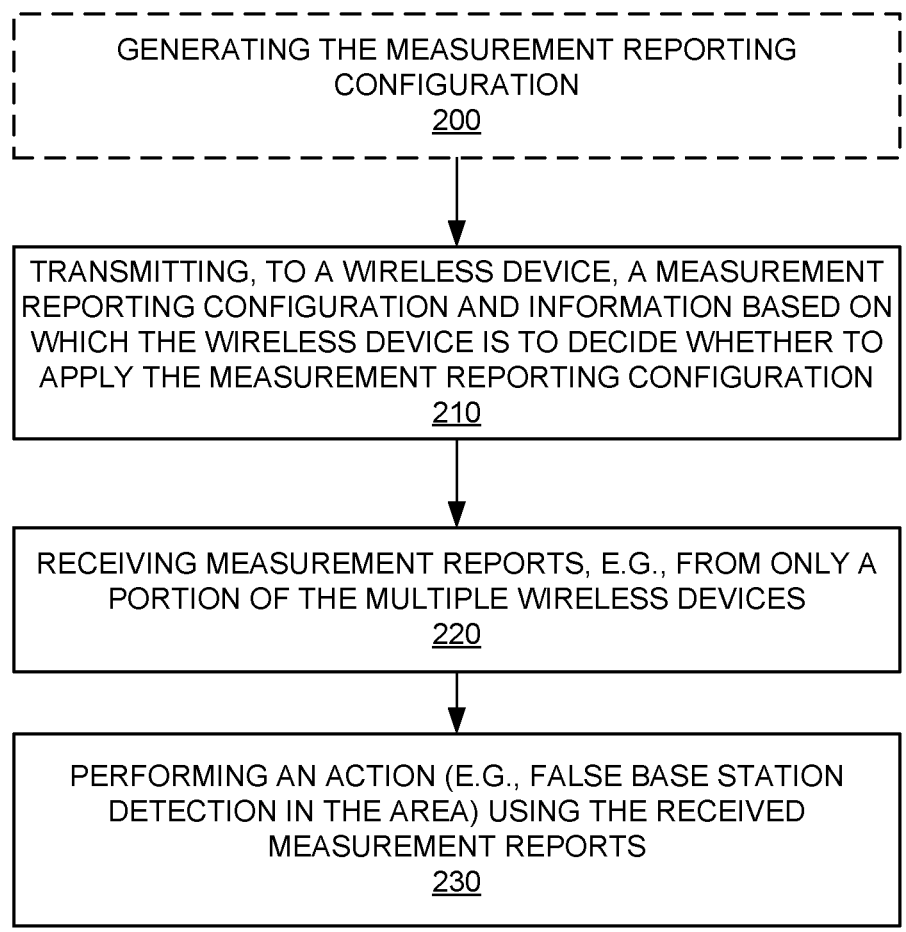
FIG. 5 is a logic flow diagram of a method performed by network equipment according to some embodiments.

In view of the above modifications and variations, FIG. 5 depicts a method performed by the network equipment 12 configured for use in the wireless communication network 10 in accordance with other particular embodiments. The method includes transmitting, to a wireless device 14, a measurement reporting configuration 32 and information 36 based on which the wireless device 14 is to decide whether to apply the measurement reporting configuration 32 (Block 210). In some embodiments, the method may also comprise generating the measurement reporting configuration 32 (Block 200).

The method further comprises receiving measurement reports, e.g., from only a portion of the multiple wireless devices (Block 220). The method further comprise performing an action (e.g., false base station detection in an area) using the received measurement reports (Block 230).

In some embodiments, the information 36 comprises information based on which the wireless device is to decide whether to apply the measurement reporting configuration 32 or to discard the measurement reporting configuration.

In some embodiments, the information 36 comprises a threshold, wherein the wireless device is to decide whether to apply the measurement reporting configuration 32 based on whether a number randomly generated by the wireless device exceeds the threshold.

In other embodiments, the information 36 comprises a certain number, wherein the wireless device is to decide whether to apply the measurement reporting configuration 32 based on whether a device identifier of the wireless device is evenly divisible by the certain number.

In some embodiments, the method further comprises determining which wireless devices are to report which measurements in the set, based on one or more device properties. For example, in some embodiments, the one or more device properties include one or more of: device identity; device access class; device radio capabilities; device brand or model; device screen size; device price; device Radio Resource Control, RRC, state; device service type; device subscriber profile; device quality of service, QoS, profile; or device network slice.

In some embodiments, the measurement reporting configuration 32 is a configuration for reporting one or more measurements usable to detect a false base station.

In some embodiments, the measurement reporting configuration 32 is a configuration for reporting one or more measurements usable for a self-organizing network, minimization of drive testing, automatic neighbour relations, or mobility.

In some embodiments, the measurement reporting configuration 32 is a configuration for reporting one or more measurements in a Radio Resource Control, RRC, connected state. In other embodiments, the measurement reporting configuration is a configuration for reporting one or more measurements in a Radio Resource Control, RRC, idle state or an RRC inactive state.

Figure 6:
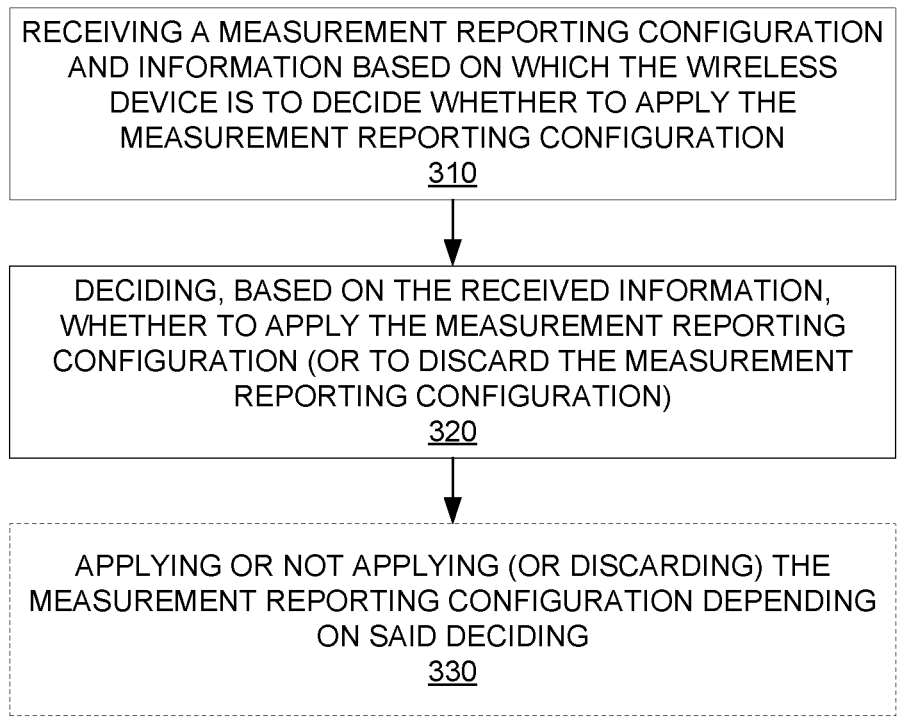
FIG. 6 is a logic flow diagram of a method performed by a wireless device according to some embodiments.

FIG. 6 depicts a method performed by a wireless device 14 in accordance with other particular embodiments. The method includes receiving a measurement reporting configuration 32 and information 36 based on which the wireless device 14 is to decide whether to apply the measurement reporting configuration 32 (Block 310).

In some embodiments, the method further comprises deciding, based on the received information 36, whether to apply the measurement reporting configuration 32 (Block 320). This decision may just be a decision of whether to apply or not apply the measurement reporting configuration 32. Or, the decision may be a decision of whether to apply the measurement reporting configuration 32 or to discard the measurement reporting configuration 32. In either case, the method may further comprise applying or not applying (or discarding) the measurement reporting configuration 32 depending on said deciding (Block 330).

In some embodiments, the information 36 comprises a threshold. In one such embodiment, then, the method may further comprise generating a random number and either: deciding whether or not to apply the measurement reporting configuration 32 depending respectively on whether or not the generated random number exceeds the threshold; or deciding whether to apply the measurement reporting configuration 32 or to discard the measurement reporting configuration 32 depending respectively on whether or not the generated random number exceeds the threshold.

In other embodiments, the information 36 comprises a certain number.

In some embodiments, the information 36 comprises an indication of one or more device properties, wherein the one or more device properties include one or more of: device identity; device access class; device radio capabilities; device brand or model; device screen size; device price; device Radio Resource Control, RRC, state; device service type; device subscriber profile; device quality of service, QoS, profile; or device network slice.

In some embodiments, the measurement reporting configuration 32 is a configuration for reporting one or more measurements usable to detect a false base station.

In some embodiments, the measurement reporting configuration 32 is a configuration for reporting one or more measurements usable for a self-organizing network, minimization of drive testing, automatic neighbour relations, or mobility.

In some embodiments, the measurement reporting configuration 32 is a configuration for reporting one or more measurements in a Radio Resource Control, RRC, connected state. In other embodiments, the measurement reporting configuration is a configuration for reporting one or more measurements in a Radio Resource Control, RRC, idle state or an RRC inactive state.

Embodiments herein also include corresponding apparatuses. Embodiments herein for instance include a wireless device configured to perform any of the steps of any of the embodiments described above for the wireless device.

Embodiments also include a wireless device 14 comprising processing circuitry and power supply circuitry. The processing circuitry is configured to perform any of the steps of any of the embodiments described above for the wireless device. The power supply circuitry is configured to supply power to the wireless device.

Embodiments further include a wireless device 14 comprising processing circuitry. The processing circuitry is configured to perform any of the steps of any of the embodiments described above for the wireless device. In some embodiments, the wireless device further comprises communication circuitry.

Embodiments further include a wireless device 14 comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include network equipment 12 configured to perform any of the steps of any of the embodiments described above for the network equipment.

Embodiments also include network equipment 12 comprising processing circuitry and power supply circuitry. The processing circuitry is configured to perform any of the steps of any of the embodiments described above for the network equipment. The power supply circuitry is configured to supply power to the network equipment.

Embodiments further include network equipment 12 comprising processing circuitry. The processing circuitry is configured to perform any of the steps of any of the embodiments described above for the network equipment. In some embodiments, the network equipment further comprises communication circuitry.

Embodiments further include network equipment 12 comprising processing circuitry and memory. The memory contains instructions executable by the processing circuitry whereby the network equipment is configured to perform any of the steps of any of the embodiments described above for the network equipment.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
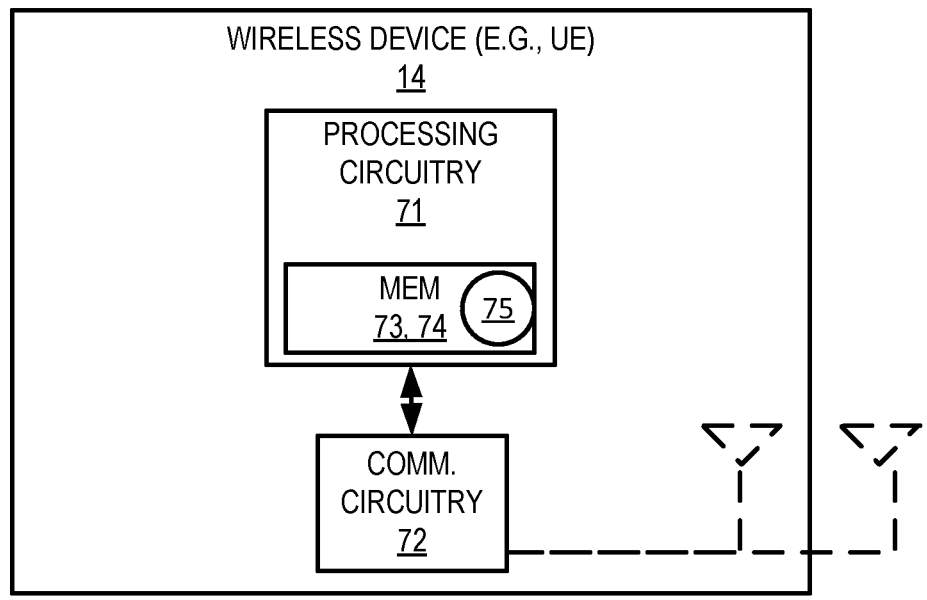
FIG. 7 is a block diagram of a wireless device according to some embodiments.

FIG. 7 for example illustrates a wireless device 14 as implemented in accordance with one or more embodiments. As shown, the wireless device 14 includes a processing circuitry 71 and a communication circuitry 72. The communication circuitry 72 (e.g., radio circuitry) is configured to transmit and/or receive information to and/or from one or more other nodes, e.g., via any communication technology. Such communication may occur via one or more antennas that are either internal or external to the wireless device 14. The processing circuitry 71 is configured to perform processing described above, such as by executing instructions stored in a computer readable storage medium 73 in the form of a memory 74. The processing circuitry 71 in this regard may implement certain functional means, units, or modules. The computer readable storage medium 73 stores a computer program 75, which when run on a processor/the processing circuitry 71 of the wireless device 14, causes the wireless device to perform the method described above, such as that disclosed in conjunction with FIG. 6.

Figure 8:
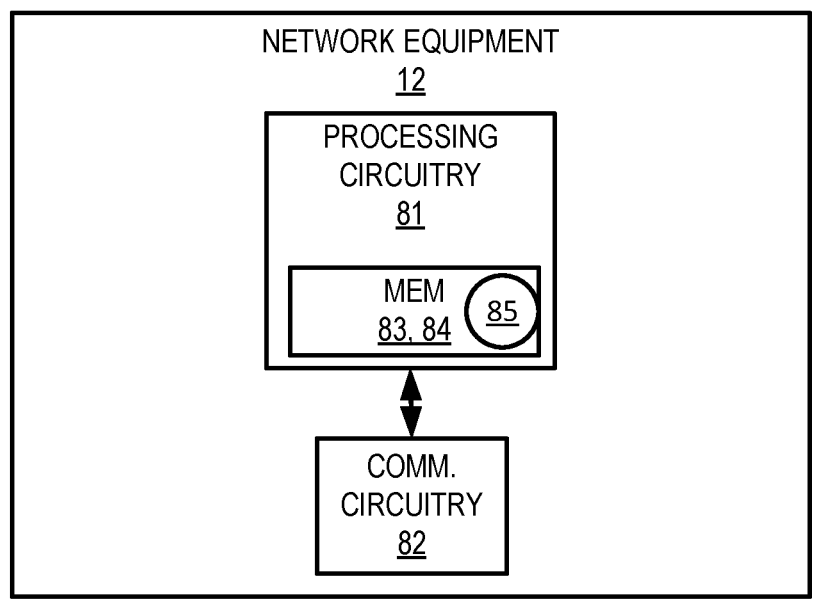
FIG. 8 is a block diagram of network equipment according to some embodiments.

FIG. 8 illustrates the network equipment 12 as implemented in accordance with one or more embodiments. As shown, the network equipment 12 includes a processing circuitry 81 and a communication circuitry 82. The communication circuitry 82 is configured to transmit and/or receive information to and/or from one or more other nodes, e.g., via any communication technology. The processing circuitry 81 is configured to perform processing described above, such as by executing instructions stored in a computer readable storage medium 83 in the form of a memory 84. The processing circuitry 81 in this regard may implement certain functional means, units, or modules. The computer readable storage medium 83 stores a computer program 85, which when run on a processor/the processing circuitry 81 of the network equipment 12, causes the network equipment to perform the corresponding methods described above, such as those disclosed in conjunction with FIGS. 3 and 5.

Note that, in some embodiments, the network equipment 12 includes radio network equipment in a radio access network (RAN), such as a base station, radio network controller, or base station transceiver or controller. In other embodiments, the network equipment 12 includes core network equipment in a core network (CN), e.g., implementing an Access and Management Function (AMF), a Session Management Function (SMF), a Mobility Management Entity (MME), a Serving Gateway Support Node (SGSN), a Mobile Switching Center (MSC), etc. In still other embodiments, the network equipment 12 is an operations and management node.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or a computer readable storage medium.

Additional embodiments will now be described. At least some of these embodiments may be described as applicable in certain contexts and/or wireless network types for illustrative purposes, but the embodiments are similarly applicable in other contexts and/or wireless network types not explicitly described.

A wireless device 14/user equipment (UE) in RRC_CONNECTED state can be configured by the network to provide measurements of neighbor cells to facilitate handovers and enable SON (Self-Organizing Network) features. These measurement reports can also be used for security purposes to detect false base stations in the network. Such a framework for false base station detection is currently described in the informative Annex E of the 3GPP TS 33.501 Security architecture and procedures for 5G System, v16.1.0. This type of network-based detection aims to detect deviation/anomaly from expected behavior/pattern in the measurement reports. For example, an unexpected Physical Cell Identity (PCI) is an anomaly.

Measurement Reporting

Figure 9:
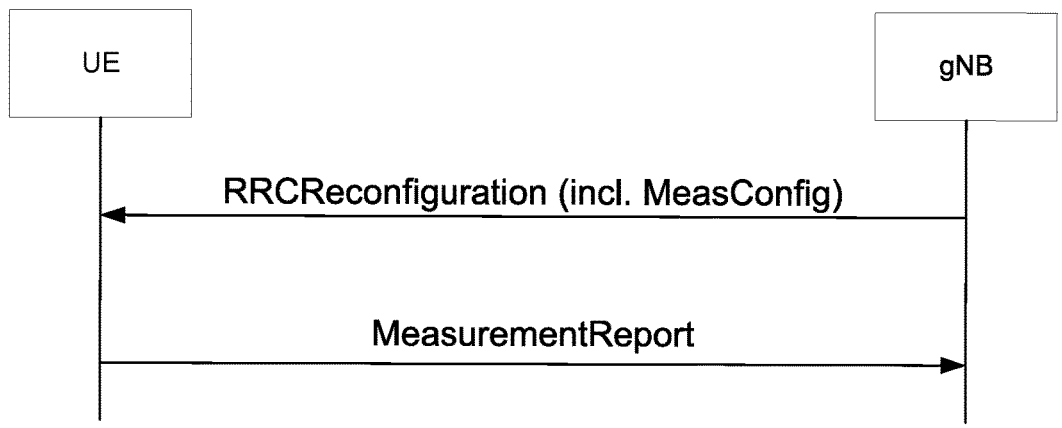
FIG. 9 is a call flow diagram of a measurement reporting procedure according to some embodiments.

As shown in FIG. 9, measurement reporting in New Radio (NR) is configured using the Radio Resource Control (RRC) connection reconfiguration procedure, wherein an RRCReconfiguration message is sent from an NR base station, gNB, to a UE such as the wireless device 14. The RRCReconfiguraiton message contains the measurement configuration for the configuration of the UE. The measurement configuration specifies the frequencies to measure and the trigger for generating the measurement report (e.g. neighbor cell becomes X dB better than serving cell).

The UE measurement report specified in 3GPP TR 38.331 NR protocol specification, v15.7.0 already contain information relevant for the detection of false base stations, e.g., Physical Cell Identity (PCI) and received-signal strength information of the cell (e.g. Reference Signal Received Power, RSRP, Reference Signal Received Quality, RSRQ). Additionally, 3GPP TS 38.331 provides support for reporting of Cell Global Identity (CGI) broadcasted in System Information Block #1 (SIB1) of the cell.

In addition to the existing information, the measurement report can be enriched with additional information useful for false base station detection. For instance, to verify the system information broadcasted in the cell, the UE could provide a hash of the Master Information Block (MIB) and System Information Blocks (SIBs) in the cell like below.

mib_info=hash of the MIB
sib_info=list of {SIB number, hash of the SIB}

Logged Measurement Reporting

NR also supports another type of measurement report, called logged measurement report, which is used to report measurements collected in RRC_IDLE and RRC_INACTIVE. The logged measurement report contains similar information as the measurement report (e.g. cell identity and signal strength information) and can also be potentially enriched in future with additional information useful for false base station detection.

Figure 10:
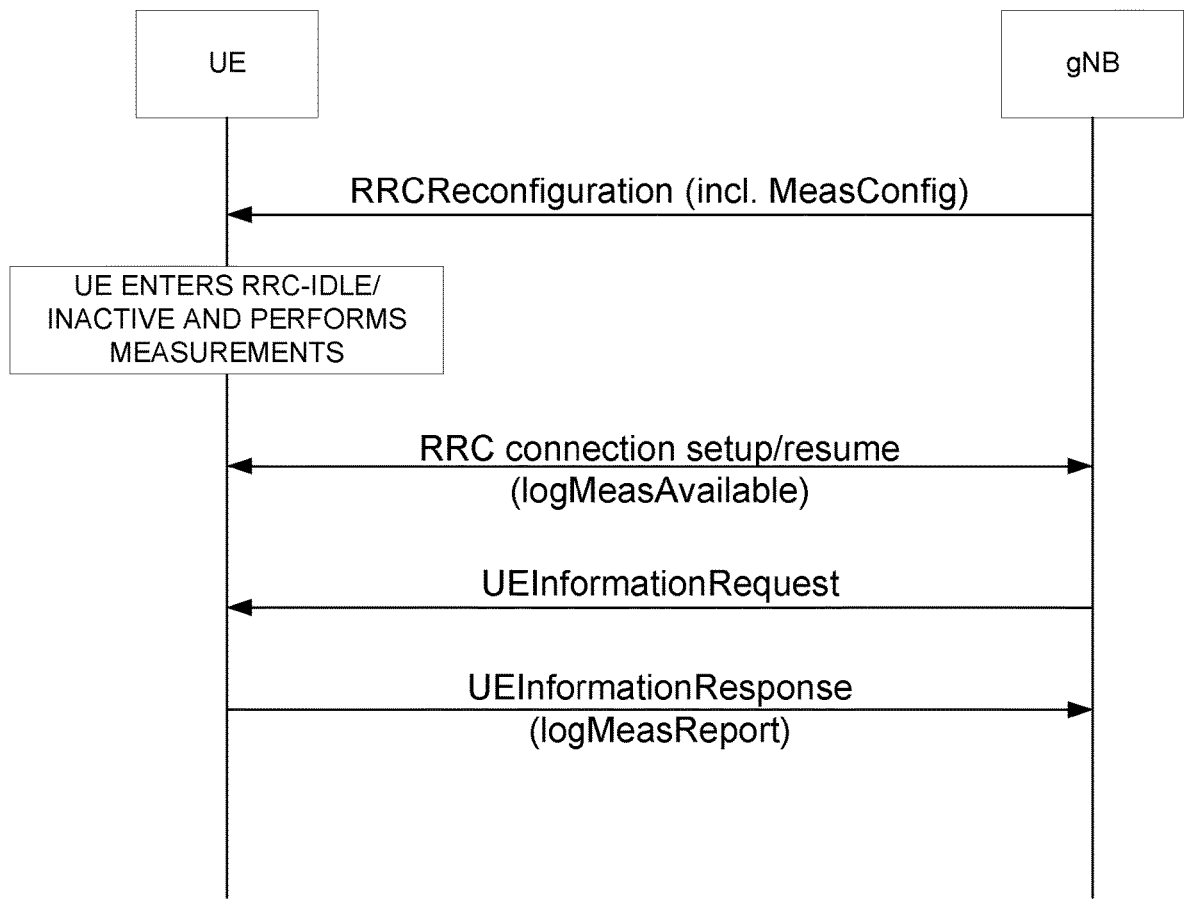
FIG. 10 is a call flow diagram of logged measurement reporting according to some embodiments.

As shown in FIG. 10, logged measurement reporting in NR is configured by the network using the LoggedMeasuremeConfiguration message while the UE is in RRC_CONNECTED state. When the UE enters RRC_IDLE/RRC_INACTIVE state, it performs measurement according to the logged measurement configuration. The next time the UE establishes, reestablishes or resumes an RRC connection it indicates that it has logged measurements available and the network can then retrieve these using the UEInformationRequest/UEInformationResponse procedure.

There currently exist certain challenge(s). False base station detection benefits the system as a whole. However, for the individual UE/wireless device 14 that has to provide the measurement reports for this particular purpose, it may cause service interruption and increase power consumption. Since measurement reporting was originally meant for the purpose of handovers and SON features, the new feature of false station detection could increase demands on the UEs. Further, if in the future, enriched measurement reports are standardized, then the demand on the UEs would increase even further. It is a very challenging problem, then, to be able to reap the benefits of false base station detection while minimizing effects on the UEs.

Certain aspects of the disclosure and their embodiments may provide solutions to these or other challenges. Some embodiments configure measurement reports (e.g., enriched measurement reports for false base station detection) in a smart way, in order to minimize the demand or effect on UEs (in terms of service interruption or power consumption). One or more embodiments, for example, enables the network to distribute the measurement reporting (e.g., for false base station detection) across multiple UEs, thus reducing the overhead for any individual UE. Alternatively or additionally, by adapting the amount and type of measurement reporting assigned to a UE based on the properties of the individual UE (e.g. state, subscription/service type, radio capabilities), some embodiments achieve a fairer distribution of the detection work and/or reduce the negative impacts on the UE. Finally, to further reduce the overhead, the network can choose to confine the detection process to certain areas and vary the number of UEs providing measurements reports based on certain criteria, e.g., the level of suspicion and the required speed of detection.

Certain embodiments may provide one or more of the following technical advantage(s). Some embodiments enable measurement reporting for false base station detection to be configured in a way that minimizes the overhead for the UE. Having a low overhead is important to gain support for the feature from stakeholders (e.g. operators, subscribers, UE and network vendors) and ensure that the feature is widely implemented by UEs.

More particularly, according to some embodiments, the network distributes the false base station measurement reporting across UEs by first partitioning the cells to be measured and then configuring each UE to provide measurement reports for the cells in one of these partitions. The partitioning can be done along one or more of the following "dimensions":

Based on cell location

Different UEs provide measurement reports for cells in different areas. The area where the UE should search for cells can be indicated by e.g. specifying the Global Positioning System (GPS) coordinates of the desired area, specifying a tracking area code that the cells belong to, famous landmarks, name of nearby shopping malls, etc.

Based on cell frequency

Different UEs provide measurement reports for cells on different frequency layers. For example, UE_A searches and provide measurement reports for cells on frequency F1 while UE_B searches and provides measurements for cells on frequency F2. The frequency to be measured can be indicated by e.g. specifying the ARFCN of the frequency, frequency band name, etc.

Based on cell identity

Different UEs provide measurements of cells with different cell identifiers or Physical Cell Identities (PCIs) or from different PCI ranges. For example, UE A searches and provides measurement reports for cells with PCI≤X while UE_B searches and provides measurement reports for cells with PCI>X).

Based on measurement type

Different UEs report different types of cell measurements in the measurement report. For example, if enriched measurement reporting is used, UE_A can report the hash of SIBX while UE_B reports the hash of SIBY.

Based on time

Different UEs searches for cells and provide measurement for detected cells at different times and/or different times of day. For example, UE_A provides measurements in morning, and UE_B provides measurements in evening.

The UEs that are configured with measurement reporting can be selected randomly by the network or selected based on some property of the UE such as the UE identity (e.g. International Mobile Subscriber Identity, IMSI, Globally Unique Temporary ID, GUTI, Cell Radio Network Temporary Identity, C-RNTI, International Mobile Equipment Identifier, IMEI, I-RNTI, etc.). For example, if every X UE should participate in the detection process the network could configure the UE to provide measurement reports if the UE's identity is evenly divisible by X. Other UE properties, such as access class, radio capabilities, brand or model of the device, screen size, price of the device, etc., can also be used for the selection.

The network can additionally or alternatively vary area and the number of UEs participating in the detection process depending on the level of suspicion, the desired speed of the detection or the desired level of assurance. For example, under normal operating conditions none or only few UEs would be configured to provide measurement reports. However, if the operator suspects that there may be false base station in an area, more UEs would be configured to provide measurements in that area.

Furthermore, the network can adapt the measurement configuration based on the properties of the UE, such as the RRC state of the UE, the UE service type and the UE radio capabilities. Some examples of how the UE properties may be taken into account in the measurement configuration are given below.

In some embodiments, UEs in RRC_CONNECTED state are more sensitive to interruption and are therefore only be configured with a minimal set of measurements, while UEs in RRC_IDLE/RRC_INACTIVE state are less sensitive to interruption and are provided more measurements.

Alternatively or additionally, mobile broadband (MBB) UEs are less sensitive to interruption than ultra-reliable-low-latency (URLLC) UEs and may therefore be configured to provide more measurements. The service type can be determined based on e.g. the UE subscriber profile, network slice, or Quality of Service (QoS) profile.

The UE radio capabilities include the radio access technologies (e.g. GSM, UTRA, E-UTRA, NR), frequency bands etc. supported by the UE and therefore in some embodiments are taken into account during the measurement configuration. For example, to locate false GSM base station the UE has to be GSM-capable.

In some embodiments described above, the network decides how to distribute the measurement reporting across the UE and configures each UE accordingly. In other embodiments, the UE decides whether to provide a measurement report and/or what to include in the measurement report. The decision may be done in the same way as described above except that the UE takes the decision and not the network. For example, the network can configure all UEs with the same measurement reporting configuration, but the UE only performs a measurement and provides a measurement report if a random number generated by the UE is above certain threshold or if the UE identity is even divisible by a certain number. The advantage of this alternative solutions is simplicity on the network side.

A person skilled-in-the-art would also appreciate that the teachings herein are extendable to be other purposes beyond false base station detection, e.g., for self organizing networks (SON), minimization of drive tests (MDT), automatic neighbor relation (ANR), measurements for handovers, measurements for conditional handovers, etc.

Figure 11:
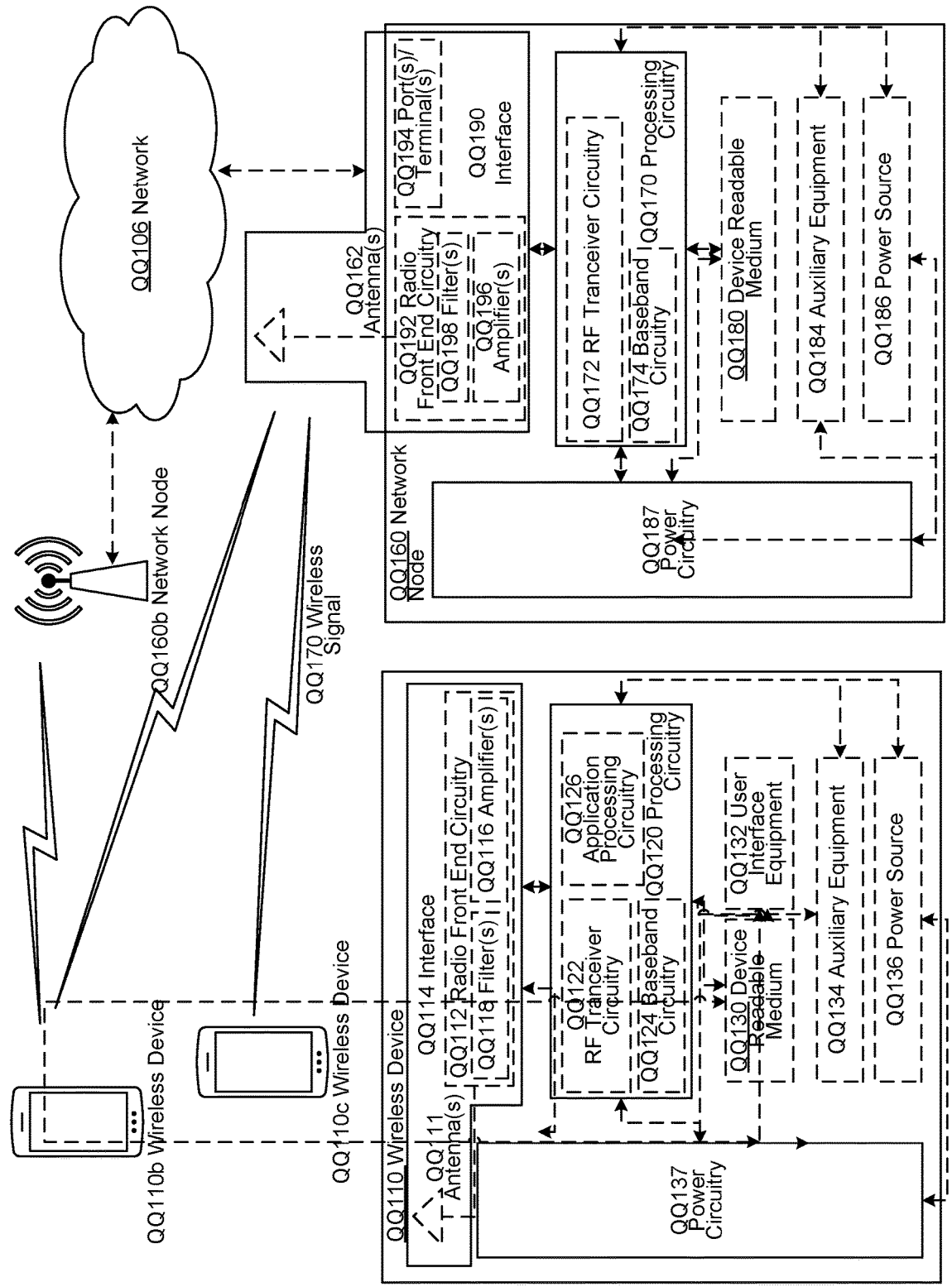
FIG. 11 is a block diagram of a wireless communication network according to some embodiments.

Although the subject matter described herein may be implemented in any appropriate type of system using any suitable components, the embodiments disclosed herein are described in relation to the wireless communication network 10, such as the example wireless network illustrated in FIG. 11. For simplicity, the wireless network of FIG. 11 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB, gNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
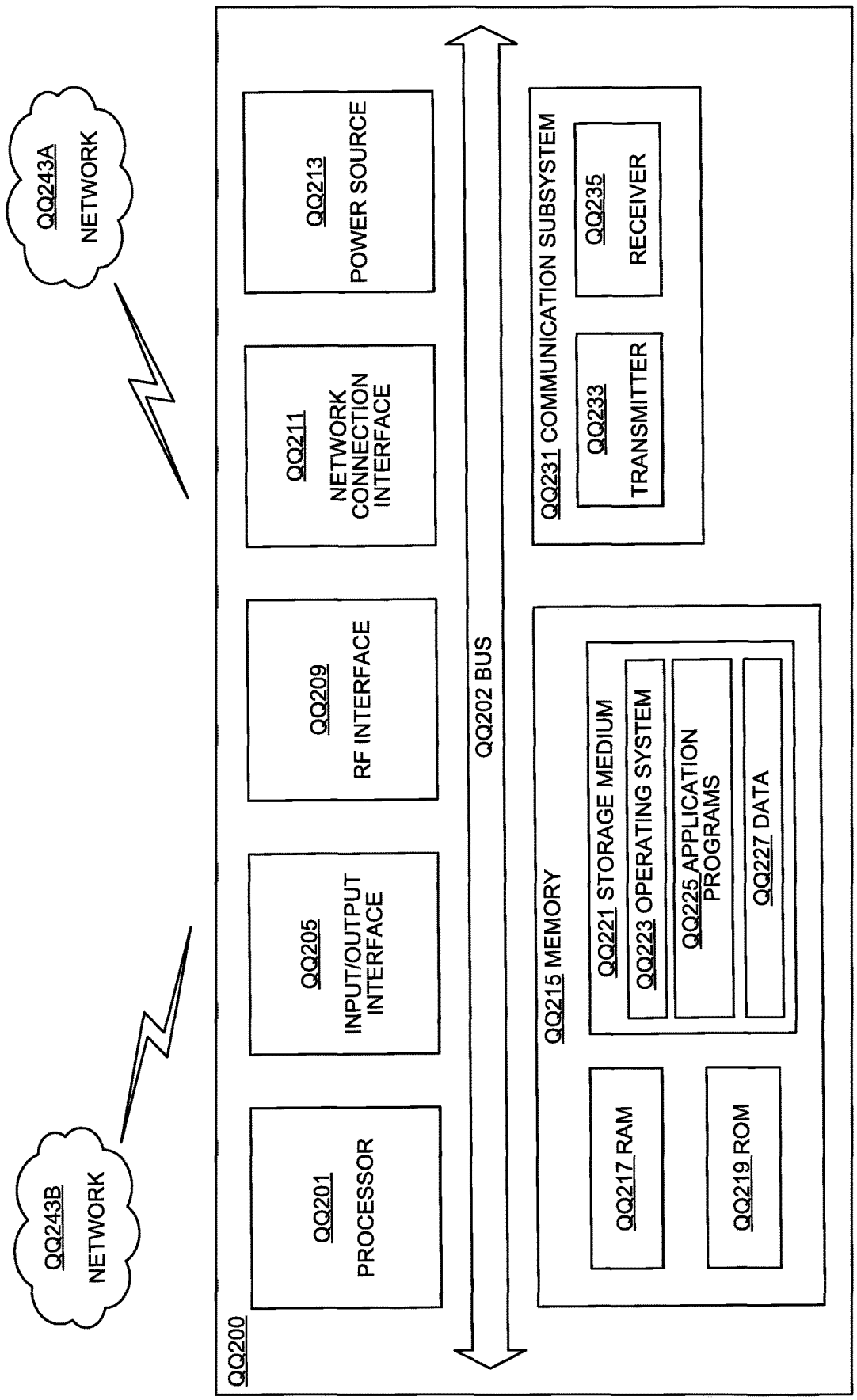
FIG. 12 is a block diagram of a user equipment according to some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
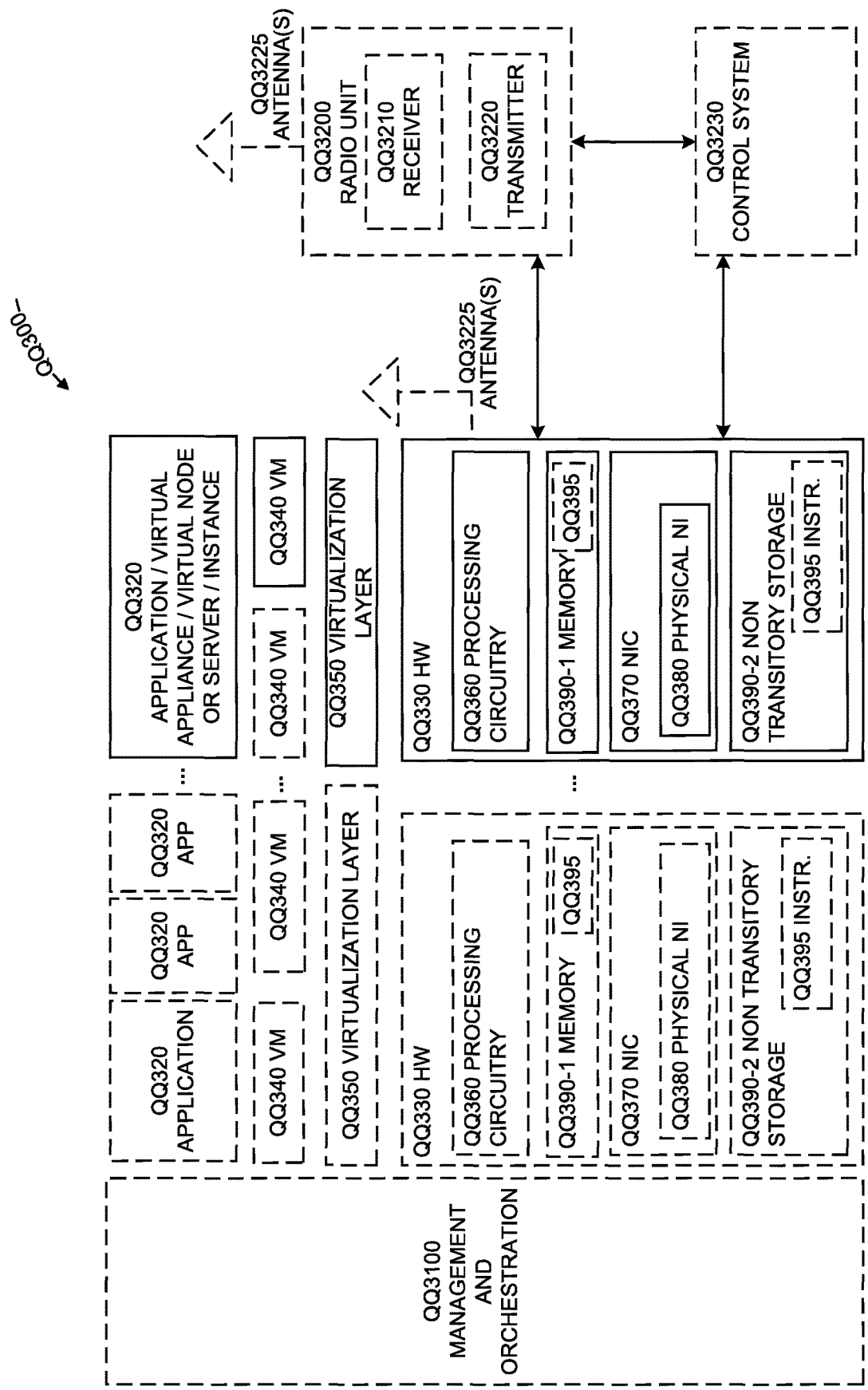
FIG. 13 is a block diagram of a virtualization environment according to some embodiments.

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 13.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 14:
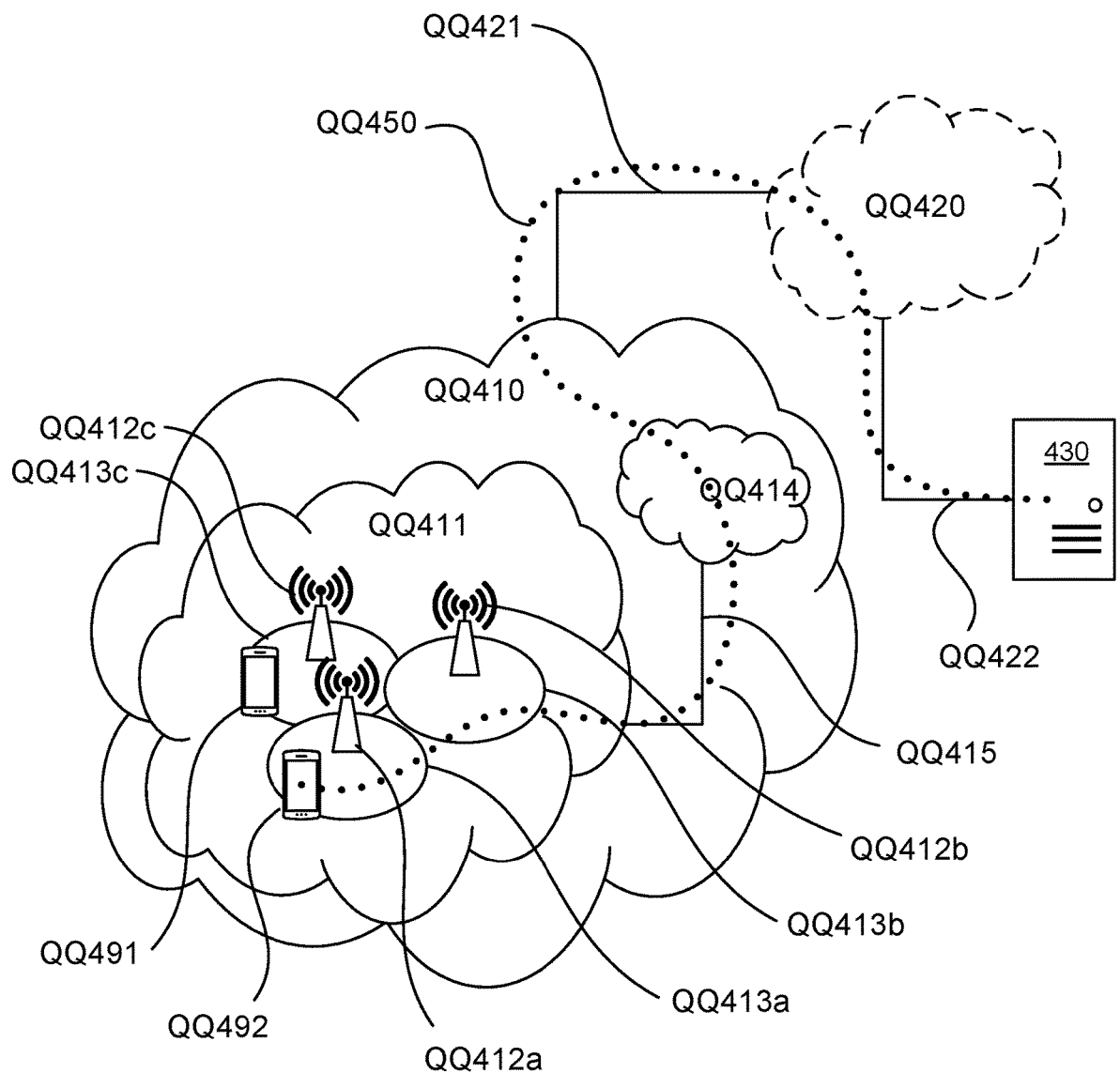
FIG. 14 is a block diagram of a communication network with a host computer according to some embodiments.

FIG. 14 illustrates a telecommunication network connected via an intermediate network to a host computer in accordance with some embodiments. In particular, with reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections QQ421 and QQ422 between telecommunication network QQ410 and host computer 430 may extend directly from core network QQ414 to host computer 430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer 430. The connectivity may be described as an over-the-top (OTT) connection QQ450. Host computer 430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer 430 to be forwarded (e.g., handed over) to a connected UE QQ491. Similarly, base station QQ412 need not be aware of the future routing of an outgoing uplink communication originating from the UE QQ491 towards the host computer 430.

Figure 15:
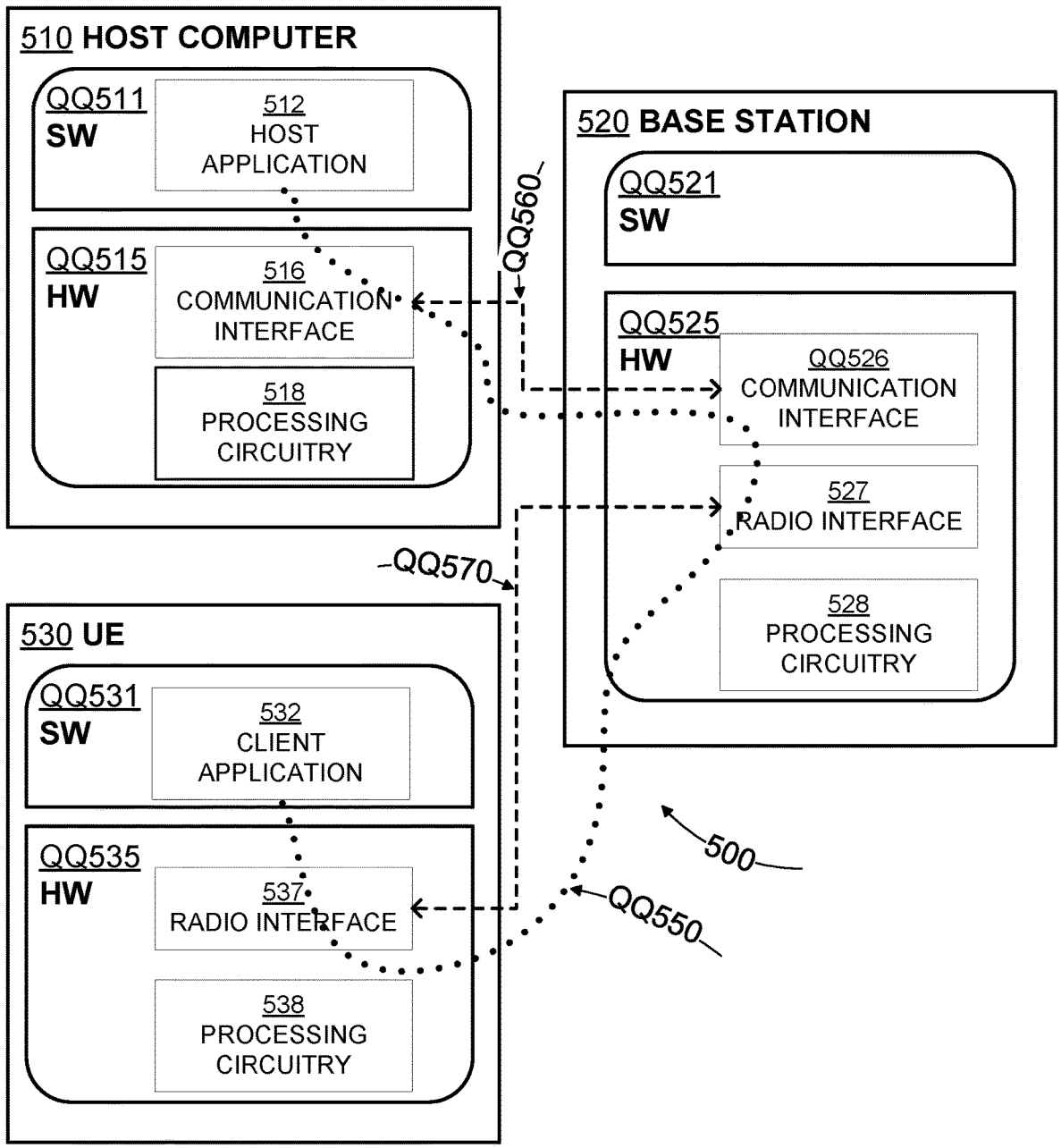
FIG. 15 is a block diagram of a host computer according to some embodiments.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments In communication system QQ500, host computer 510 comprises hardware QQ515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software QQ511, which is stored in or accessible by host computer 510 and executable by processing circuitry 518. Software QQ511 includes host application 512. Host application 512 may be operable to provide a service to a remote user, such as UE 530 connecting via OTT connection QQ550 terminating at UE 530 and host computer 510. In providing the service to the remote user, host application 512 may provide user data which is transmitted using OTT connection QQ550.

Communication system 500 further includes base station 520 provided in a telecommunication system and comprising hardware QQ525 enabling it to communicate with host computer 510 and with UE 530. Hardware QQ525 may include communication interface QQ526 for setting up and maintaining a wired or wireless connection with an interface of a different communication device of communication system 500, as well as radio interface 527 for setting up and maintaining at least wireless connection QQ570 with UE 530 located in a coverage area (not shown in FIG. 15) served by base station 520. Communication interface QQ526 may be configured to facilitate connection QQ560 to host computer 510. Connection QQ560 may be direct or it may pass through a core network (not shown in FIG. 15) of the telecommunication system and/or through one or more intermediate networks outside the telecommunication system. In the embodiment shown, hardware QQ525 of base station 520 further includes processing circuitry 528, which may comprise one or more programmable processors, application-specific integrated circuits, field programmable gate arrays or combinations of these (not shown) adapted to execute instructions. Base station 520 further has software QQ521 stored internally or accessible via an external connection.

Communication system 500 further includes UE 530 already referred to. Its hardware QQ535 may include radio interface 537 configured to set up and maintain wireless connection QQ570 with a base station serving a coverage area in which UE 530 is currently located. Hardware QQ535 of UE 530 further includes processing circuitry 538, which may comprise one or more programmable processors, application-specific integrated circuits, field programmable gate arrays or combinations of these (not shown) adapted to execute instructions. UE 530 further comprises software QQ531, which is stored in or accessible by UE 530 and executable by processing circuitry 538. Software QQ531 includes client application 532. Client application 532 may be operable to provide a service to a human or non-human user via UE 530, with the support of host computer 510. In host computer 510, an executing host application 512 may communicate with the executing client application 532 via OTT connection QQ550 terminating at UE 530 and host computer 510. In providing the service to the user, client application 532 may receive request data from host application 512 and provide user data in response to the request data. OTT connection QQ550 may transfer both the request data and the user data. Client application 532 may interact with the user to generate the user data that it provides.

It is noted that host computer 510, base station 520 and UE 530 illustrated in FIG. 15 may be similar or identical to host computer 430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection QQ550 is active, the network infrastructure may further take decisions by which it dynamically changes the routing (e.g., on the basis of load balancing consideration or reconfiguration of the network).

Wireless connection QQ570 between UE 530 and base station 520 is in accordance with the teachings of the embodiments described throughout this disclosure. One or more of the various embodiments improve the performance of OTT services provided to UE 530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer 510 and UE 530, in response to variations in the measurement results. The measurement procedure and/or the network functionality for reconfiguring OTT connection QQ550 may be implemented in software QQ511 and hardware QQ515 of host computer 510 or in software QQ531 and hardware QQ535 of UE 530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 16:
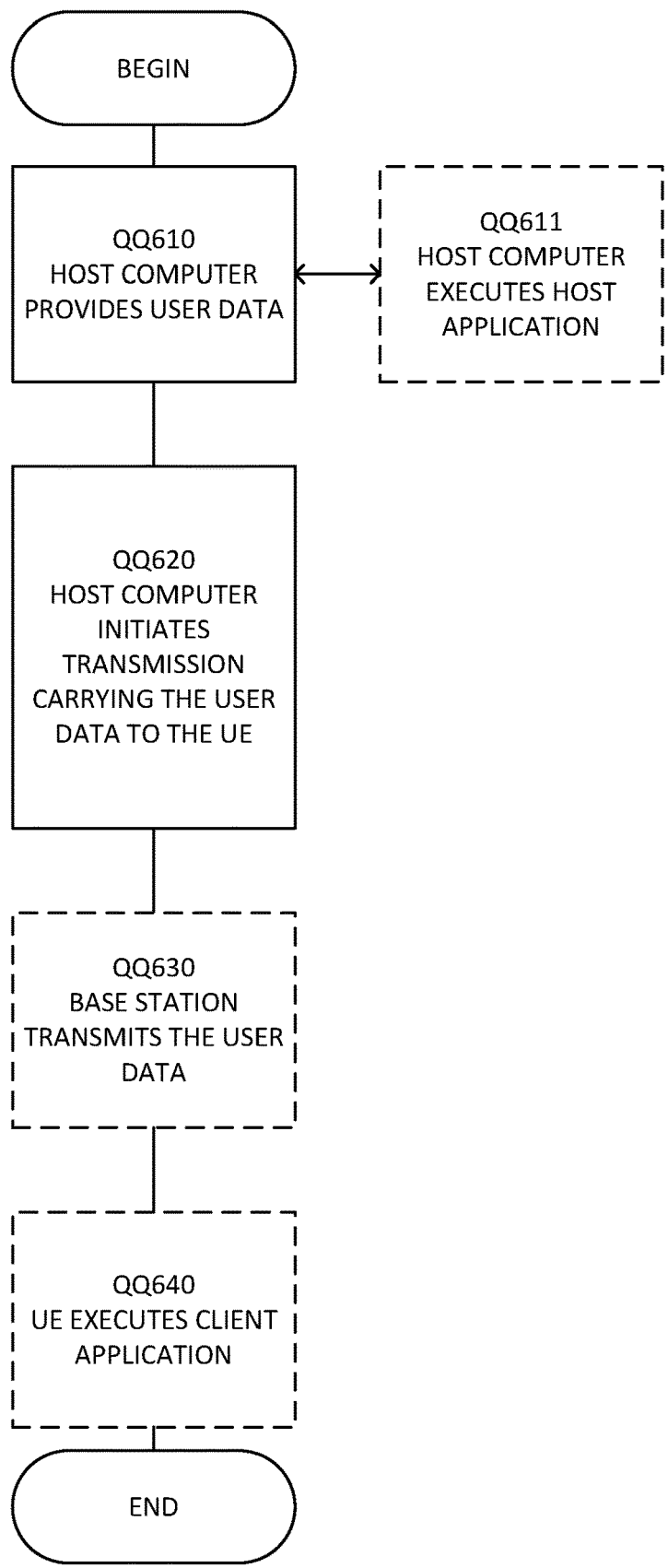
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 17:
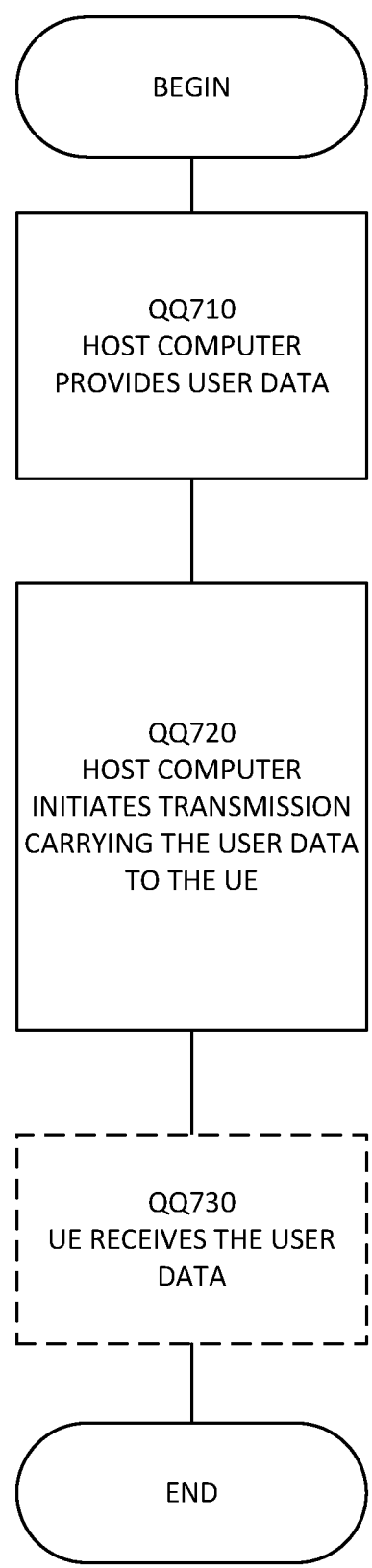
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 18:
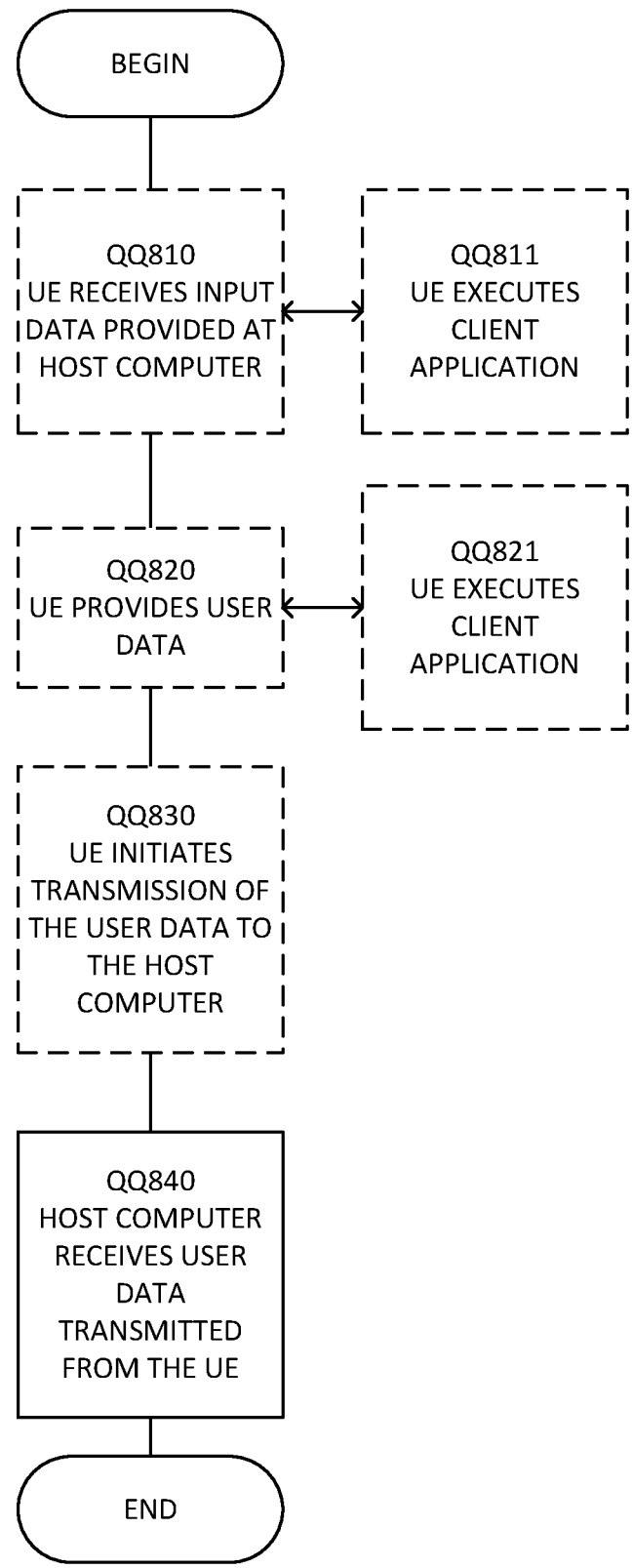
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 19:
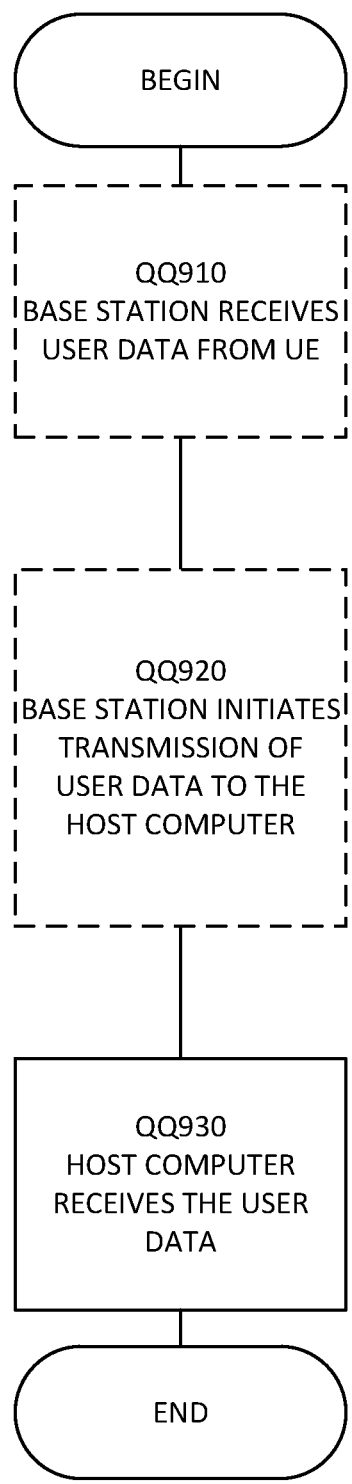
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

EMBODIMENTS

Group A Embodiments

A1. A method performed by a wireless device, the method comprising:
  receiving a measurement reporting configuration and information based on which the wireless device is to decide whether to apply the measurement reporting configuration.

A2. The method of embodiment A1, further comprising:
  deciding, based on the received information, whether to apply the measurement reporting configuration; and
  applying or not applying the measurement reporting configuration depending on said deciding.

A3. The method of any of embodiments A1-A2, wherein the information is information based on which the wireless device is to decide whether to apply the measurement reporting configuration or discard the measurement reporting configuration.

A4. The method of any of embodiments A1 or A3, further comprising:
  deciding, based on the received information, whether to apply the measurement reporting configuration or to discard the measurement reporting configuration; and
  applying or discarding the measurement reporting configuration depending on said deciding.

A5. The method of any of embodiments A1-A4, wherein the information comprises a threshold.

A6. The method of embodiment A5, further comprising generating a random number and either:
  deciding whether or not to apply the measurement reporting configuration depending respectively on whether or not the generated random number exceeds the threshold; or
  deciding whether to apply the measurement reporting configuration or to discard the measurement reporting configuration depending respectively on whether or not the generated random number exceeds the threshold.

A7. The method of any of embodiments A1-A4, wherein the information comprises a certain number.

A8. The method of embodiment A7, further comprising computing a result of dividing a device identifier of the wireless device by the certain number, and either:
  deciding whether or not to apply the measurement reporting configuration depending respectively on whether or not the computed remainder result is zero (modulus operation); or
  deciding whether to apply the measurement reporting configuration or to discard the measurement reporting configuration depending respectively on whether or not the computed result is zero.

A9. The method of any of embodiments A1-A4, wherein the information comprises an indication of one or more device properties, wherein the one or more device properties include one or more of:
  device identity;
  device access class;
  device radio capabilities;
  device brand or model;
  device screen size;
  device price;
  device Radio Resource Control, RRC, state;
  device service type;
  device subscriber profile;
  device quality of service, QoS, profile; or
  device network slice.

A10. The method of any of embodiments A1-A9, wherein the measurement reporting configuration is a configuration for reporting one or more measurements usable to detect a false base station.

A11. The method of any of embodiments A1-A10, wherein the measurement reporting configuration is a configuration for reporting one or more measurements usable for a self-organizing network, minimization of drive testing, automatic neighbour relations, or mobility.

A12. The method of any of embodiments A1-A11, wherein the measurement reporting configuration is a configuration for reporting one or more measurements in a Radio Resource Control, RRC, connected state.

A13. The method of any of embodiments A1-A11, wherein the measurement reporting configuration is a configuration for reporting one or more measurements in a Radio Resource Control, RRC, idle state or an RRC inactive state.

AA. The method of any of the previous embodiments, further comprising:
  providing user data; and
  forwarding the user data to a host computer via the transmission to a base station.

Group B Embodiments

B1. A method performed by network equipment configured for use in a wireless communication network, the method comprising:
  identifying a set of measurements to be used for false base station detection in an area;
  configuring different sets of one or more wireless devices to report different respective measurements in the set;
  receiving measurement reports from the different sets of one or more wireless devices as configured; and
  performing false base station detection in the area using the received measurement reports.

B2. The method of embodiment B1, wherein the set of measurements include measurements in multiple sub-areas of the area, and wherein said configuring comprises configuring the different sets of one or more wireless devices to report measurements in different sub-areas of the area.

B3. The method of embodiment B2, wherein the sub-areas of the area correspond to:
  cells providing radio coverage over the area;
  core network tracking areas covering the area;
  geographical regions in the area; or
  points of interest in the area.

B4. The method of any of embodiments B1-B3, wherein the set of measurements include measurements on multiple frequencies or frequency ranges, and wherein said configuring comprises configuring the different sets of one or more wireless devices to report measurements on different frequencies or frequency ranges.

B5. The method of any of embodiments B1-B4, wherein the set of measurements includes measurements of cells identified by multiple cell identifiers, and wherein said configuring comprises configuring the different sets of one or more wireless devices to report measurements of cells identified by different cell identifiers.

B6. The method of any of embodiments B1-B5, wherein the set of measurements includes measurements of multiple types, and wherein said configuring comprises configuring the different sets of one or more wireless devices to report measurements of different types.

B7. The method of any of embodiments B1-B6, wherein the set of measurements includes measurements performed at different times, and wherein said configuring comprises configuring the different sets of one or more wireless devices to report measurements performed at different times.

B8. The method of any of embodiments B1-B7, wherein the set of measurements includes measurements performed at different times of the day, and wherein said configuring comprises configuring the different sets of one or more wireless devices to report measurements performed at different times of the day.

B9. The method of any of embodiments B1-B8, further comprising selecting only a portion of all wireless devices in the area to use for false base station detection in the area, wherein the one or more wireless devices in each of the different sets are included in the selected portion.

B10. The method of embodiment B9, further comprising determining how many wireless devices to select to use for false base station detection in the area, based on one or more of:
 a level of suspicion that a false base station will be detected in the area;
 a speed with which false base station detection is to be performed in the area; or
 a reliability with which false base station detection is to be performed in the area.

B11. The method of any of embodiments B9-B10, wherein said selecting comprises randomly selecting the portion of all wireless devices in the area to use for false base station detection in the area.

B12. The method of any of embodiments B9-B10, wherein said selecting comprises selecting the portion of all wireless devices in the area to use for false base station detection in the area, based on one or more device properties.

B13. The method of any of embodiments B1-B12, further comprising determining which wireless devices are to report which measurements in the set, based on one or more device properties.

B14. The method of embodiment B13, wherein the one or more device properties include one or more of:
 device identity;
 device access class;
 device radio capabilities;
 device brand or model;
 device screen size;
 device price;
 device Radio Resource Control, RRC, state;
 device service type;
 device subscriber profile;
 device quality of service, QoS, profile; or
 device network slice.

B15. The method of any of embodiments B1-B14, wherein the area is a geographical region surrounding a point of interest.

B16. The method of any of embodiments B1-B15, wherein said configuring comprises configuring different sets of one or more wireless devices to report different respective measurements in the set while in a Radio Resource Control, RRC, connected state.

B17. The method of any of embodiments B1-B15, wherein said configuring comprises configuring different sets of one or more wireless devices to report different respective measurements in the set while in a Radio Resource Control, RRC, idle state or an RRC inactive state.

BB1. A method performed by network equipment configured for use in a wireless communication network, the method comprising:
 transmitting, to a wireless device, a measurement reporting configuration and information based on which the wireless device is to decide whether to apply the measurement reporting configuration.

BB2. The method of embodiment BB1, wherein the information comprises information based on which the wireless device is to decide whether to apply the measurement reporting configuration or to discard the measurement reporting configuration.

BB3. The method of any of embodiments BB1-BB2, wherein the information comprises a threshold, wherein the wireless device is to decide whether to apply the measurement reporting configuration based on whether a number randomly generated by the wireless device exceeds the threshold.

BB4. The method of any of embodiments BB1-BB2, wherein the information comprises a certain number, wherein the wireless device is to decide whether to apply the measurement reporting configuration based on whether a device identifier of the wireless device is evenly divisible by the certain number.

BB5. The method of any of embodiments BB1-BB2, wherein the information comprises an indication of one or more device properties, wherein the one or more device properties include one or more of:
 device identity;
 device access class;
 device radio capabilities;
 device brand or model;
 device screen size;
 device price;
 device Radio Resource Control, RRC, state;
 device service type;
 device subscriber profile;
 device quality of service, QoS, profile; or
 device network slice.

BB6. The method of any of embodiments BB1-BB5, wherein said transmitting comprises transmitting the measurement reporting configuration and the information to multiple wireless devices.

BB7. The method of embodiment BB6, further comprising receiving measurement reports from only a portion of the multiple wireless devices.

BB8. The method of any of embodiments BB6-BB7, further comprising performing false base station detection in an area using the received measurement reports.

BB9. The method of any of embodiments BB1-BB8, wherein the measurement reporting configuration is a configuration for reporting one or more measurements usable to detect a false base station.

BB10. The method of any of embodiments BB1-BB9, wherein the measurement reporting configuration is a configuration for reporting one or more measurements usable for a self-organizing network, minimization of drive testing, automatic neighbour relations, or mobility.

BB11. The method of any of embodiments BB1-BB10, wherein the measurement reporting configuration is a configuration for reporting one or more measurements in a Radio Resource Control, RRC, connected state.

BB12. The method of any of embodiments BB1-BB10, wherein the measurement reporting configuration is a configuration for reporting one or more measurements in a Radio Resource Control, RRC, idle state or an RRC inactive state.

BB. The method of any of the previous embodiments, further comprising:
obtaining user data; and
forwarding the user data to a host computer or a wireless device.

Group C Embodiments

C1. A wireless device configured to perform any of the steps of any of the Group A embodiments.

C2. A wireless device comprising processing circuitry configured to perform any of the steps of any of the Group A embodiments.

C3. A wireless device comprising:
communication circuitry; and
processing circuitry configured to perform any of the steps of any of the Group A embodiments.

C4. A wireless device comprising:
processing circuitry configured to perform any of the steps of any of the Group A embodiments; and
power supply circuitry configured to supply power to the wireless device.

C5. A wireless device comprising:
processing circuitry and memory, the memory containing instructions executable by the processing circuitry whereby the wireless device is configured to perform any of the steps of any of the Group A embodiments.

C6. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. Network equipment configured to perform any of the steps of any of the Group B embodiments.

C10. Network equipment comprising processing circuitry configured to perform any of the steps of any of the Group B embodiments.

C11. Network equipment comprising:
communication circuitry; and
processing circuitry configured to perform any of the steps of any of the Group B embodiments.

C12. Network equipment comprising:
processing circuitry configured to perform any of the steps of any of the Group B embodiments;
power supply circuitry configured to supply power to the network equipment.

C13. Network equipment comprising:
processing circuitry and memory, the memory containing instructions executable by the processing circuitry whereby the network equipment is configured to perform any of the steps of any of the Group B embodiments.

C14. The network equipment of any of embodiments C9-C13, wherein the network equipment implements one or more network functions.

C15. A computer program comprising instructions which, when executed by at least one processor of network equipment, causes the network equipment to carry out the steps of any of the Group B embodiments.

C16. The computer program of embodiment C14, wherein the network equipment implements one or more network functions.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the
UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

ARFCN Absolute Radio-Frequency Channel Number
E-UTRAN Evolved Universal Terrestrial Access Network
CGI Cell Global Identity
C-RNTI Cell Radio Network Temporary Identifier
gNB 5G Node B
GUTI Globally Unique Temporary Identifier
IMSI International Mobile Subscriber Identity
IMEI International Mobile Equipment Identity
LTE Long-term Evolution
MIB Master Information Block
NR New Radio
PCI Physical Cell Identity
RRC Radio Resource Control
RSRP Reference Signal Received Power
RSRO Reference Signal Received Quality
SIB System Information Block
SON Self Optimizing Network
TS Technical Specification
UE User Equipment
UTRA Universal Terrestrial Access Network
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A wireless device comprising processing circuitry and memory, the memory containing instructions executable by the processing circuitry whereby the wireless device is configured to:
  receive, from network equipment, a measurement reporting configuration for reporting one or more measurements from a set of measurements, where the one or more measurements are usable to detect a false base station;
  receive, from the network equipment, information based on which the wireless device is to decide whether to apply the measurement reporting configuration, wherein the received information comprises an indication of one or more device properties, wherein the one or more device properties include one or more of: device access class: device radio capabilities; device brand or model; device screen size; device price; device service type; device subscriber profile; device quality of service profile; or device network slice;
  decide, based on the indication of the one or more device properties, whether to apply the measurement reporting configuration; and
  apply the measurement reporting configuration, if the wireless device has decided to apply the measurement reporting configuration;
  wherein the one or more device properties include one or more of device service type, device subscriber profile, device quality of service profile, or device network slice, and
  wherein the memory contains instructions executable by the processing circuitry whereby the wireless device is configured to:
    decide to apply the measurement reporting configuration if the device service type, the device subscriber profile, the device quality of service profile, or the device network slice is associated with a Mobile Broadband (MBB) device; or
    decide to not apply the measurement reporting configuration if the device service type, the device subscriber profile, the device quality of service profile, or the device network slice is associated with a Ultra-Reliable Low-Latency Communication (URLLC) device.

2. A wireless device comprising processing circuitry and memory, the memory containing instructions executable by the processing circuitry whereby the wireless device is configured to:
  receive, from network equipment, a measurement reporting configuration for reporting one or more measurements from a set of measurements, where the one or more measurements are usable to detect a false base station;
  receive, from the network equipment, information based on which the wireless device is to decide whether to apply the measurement reporting configuration, wherein the received information comprises an indication of one or more device properties, wherein the one or more device properties include one or more of: device access class; device radio capabilities: device brand or model: device screen size; device price; device service type; device subscriber profile; device quality of service profile; or device network slice;
  decide, based on the indication of the one or more device properties, whether to apply the measurement reporting configuration; and
  apply the measurement reporting configuration, if the wireless device has decided to apply the measurement reporting configuration;
  wherein the one or more device properties include device radio capabilities, and
  wherein the memory contains instructions executable by the processing circuitry whereby the wireless device is configured to:
    decide to apply the measurement reporting configuration if the wireless device has the device radio capabilities indicated by the received information, wherein the device radio capabilities are supported by a type of false base station to be detected using the one or more measurements; or
    decide to not apply the measurement reporting configuration if the wireless device does not have the device radio capabilities indicated by the received information, wherein the device radio capabilities are supported by a type of false base station to be detected using the one or more measurements.

* * * * *